United States Patent
Andoh

(10) Patent No.: US 10,900,881 B2
(45) Date of Patent: Jan. 26, 2021

(54) PARTICULATE MATTER DETECTION SYSTEM

(71) Applicant: DENSO CORPORATION, Kariya (JP)

(72) Inventor: Kouji Andoh, Kariya (JP)

(73) Assignee: DENSO CORPORATION, Kariya (JP)

( * ) Notice: Subject to any disclaimer, the term of this patent is extended or adjusted under 35 U.S.C. 154(b) by 106 days.

(21) Appl. No.: 15/740,850

(22) PCT Filed: May 13, 2016

(86) PCT No.: PCT/JP2016/064335
§ 371 (c)(1),
(2) Date: Dec. 29, 2017

(87) PCT Pub. No.: WO2017/002463
PCT Pub. Date: Jan. 5, 2017

(65) Prior Publication Data
US 2018/0259439 A1 Sep. 13, 2018

(30) Foreign Application Priority Data

Jun. 30, 2015 (JP) .................................. 2015-131415
Jun. 30, 2015 (JP) .................................. 2015-131417

(51) Int. Cl.
*G01N 15/06* (2006.01)
*F02D 41/14* (2006.01)
(Continued)

(52) U.S. Cl.
CPC ..... *G01N 15/0656* (2013.01); *F02D 41/1466* (2013.01); *F02D 41/222* (2013.01);
(Continued)

(58) Field of Classification Search
CPC ........... G01N 15/0656; G01N 15/0606; G01N 2015/0046; F02D 41/1466; F02D 41/222;
(Continued)

(56) References Cited

U.S. PATENT DOCUMENTS

2006/0168939 A1* 8/2006 Otsubo .................. F01N 3/0253
60/274
2007/0264158 A1* 11/2007 Schmidt .................. F01N 11/00
422/94
(Continued)

FOREIGN PATENT DOCUMENTS

| JP | 63-168208 | 11/1988 |
| JP | 63168208 | * 11/1988 |
| JP | 2012-47722 | 3/2012 |
| JP | 2012-083121 | 4/2012 |

OTHER PUBLICATIONS

International Search Report issued in PCT/JP2016/064335 dated Aug. 2, 2016 (4 pages).

*Primary Examiner* — Marrit Eyassu
(74) *Attorney, Agent, or Firm* — Nixon & Vanderhye P.C.

(57) ABSTRACT

A PM detection system has a PM sensor, current detector, and control circuit. The circuit switches of a detection mode and a burning mode. In the detection mode, the control circuit prohibits supply of power to a heater and supplies a voltage between electrodes, and instructs the current detector to detect a current flowing between the electrodes. In the burning mode, the control circuit instructs the heater to generate heat energy to burn PM accumulated on an accumulation part. The control circuit judges PM has remained on the accumulation part when the detected current exceeds a threshold value, and performs the burning mode again. The system further has a pair of current detectors. Each current detector detects a leak current flowing from the heater to the electrodes through an insulation member when the heater generates heat energy. The circuit detects a sensor failure based on the detected leak current.

11 Claims, 28 Drawing Sheets

(51) Int. Cl.
*F02D 41/22* (2006.01)
*G01N 15/00* (2006.01)
(52) U.S. Cl.
CPC ...... *G01N 15/0606* (2013.01); *F01N 2560/05* (2013.01); *F01N 2560/06* (2013.01); *F01N 2560/20* (2013.01); *F02D 41/1494* (2013.01); *G01N 2015/0046* (2013.01); *Y02T 10/40* (2013.01)
(58) Field of Classification Search
CPC .. F02D 41/1494; Y02T 10/40; F01N 2560/06; F01N 2560/05; F01N 2560/20
USPC ...................................................... 73/23.33
See application file for complete search history.

(56) References Cited

U.S. PATENT DOCUMENTS

| | | | |
|---|---|---|---|
| 2007/0277515 A1* | 12/2007 | Igarashi | B01D 46/0063 60/303 |
| 2009/0051376 A1 | 2/2009 | Schnell et al. | |
| 2010/0312488 A1* | 12/2010 | Diehl | G01N 15/0656 702/23 |
| 2011/0314899 A1* | 12/2011 | Di Miro | F02D 41/1466 73/23.33 |
| 2012/0031169 A1 | 2/2012 | Sakamoto et al. | |
| 2012/0124978 A1* | 5/2012 | Futonagane | F01N 9/002 60/311 |
| 2013/0298640 A1 | 11/2013 | Ante et al. | |

\* cited by examiner

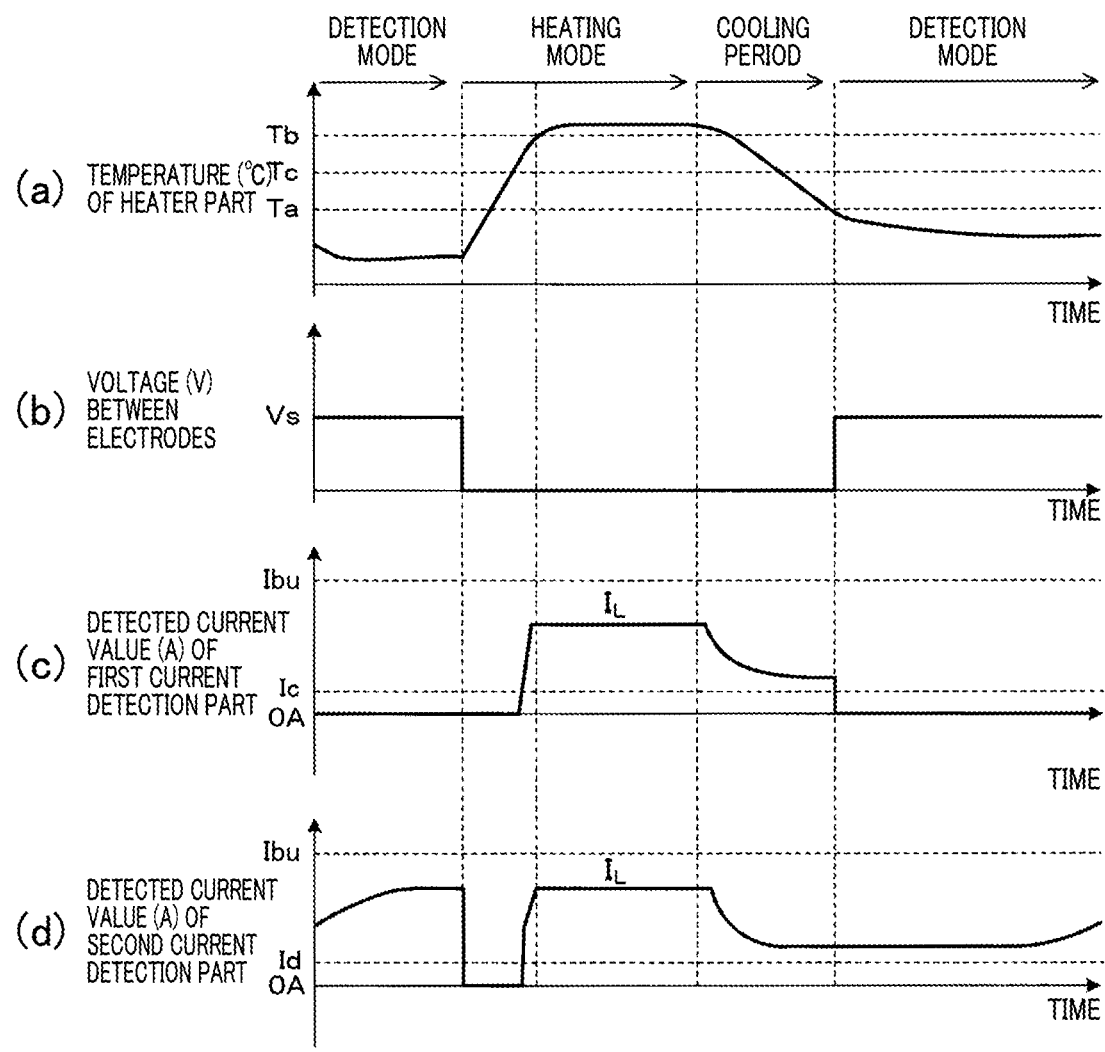

PARTICULATE MATTER DETECTION SYSTEM

This application is the U.S. national phase of International Application No. PCT/JP2016/064335 filed May 13, 2016 which designated the U.S. and claims priority to JP Patent Application No. 2015-131415 filed Jun. 30, 2015 and JP Patent Application No. 2015- 131417 filed Jun. 30, 2015, the entire contents of each of which are hereby incorporated by reference.

TECHNICAL FIELD

The present invention relates to particulate matter detection sensors measuring an amount of particulate matter contained in exhaust gas, and also relates to particulate matter detection systems equipped with a current detection part connected to the particulate matter detection sensor, and a control circuit connected to the particulate matter detection sensor and the current detection part.

BACKGROUND ART

A particulate matter detection system A (see Patent document 1) is known, which is equipped with a particulate matter (PM) detection sensor, a current detection part connected to the particulate matter detection sensor and a control circuit connected to the particulate matter detection sensor and the current detection part. The particulate matter detection sensor has a pair of electrodes and a heater for heating the electrodes. The pair of electrodes are separated from each other and from a heater for heating the electrodes.

The control circuit is configured to perform a switching control of a detection mode and a burning mode. In the detection mode, when a voltage is supplied between the pair of electrodes in the particulate matter detection sensor, particulate matter is collected on the pair of electrodes by electrostatic force, and a current flows between the pair of electrodes due to the accumulation of particulate matter. The current detection part detects this current, and the control circuit part calculates an amount of particulate matter on the basis of the detected current.

Particulate matter is collected between the electrodes after a long execution of the detection mode. As a result, the current flowing between the electrodes becomes saturated. After the saturation of the current flowing between the electrodes, the control circuit switches to the burning mode from the detection mode, and burns the accumulated particulate matter so as to remove the accumulated particulate matter from the particulate matter detection sensor. This regenerates the particulate matter detection sensor.

Further, a particulate matter detection system B (see Patent document 2) is known, which is equipped with a particulate matter detection sensor capable of detecting an amount of particulate matter (PM) contained in exhaust gas, and a current detection part connected to the particulate matter detection sensor. The particulate matter detection sensor has a pair of electrodes and a heater for heating the pair of electrodes, and an insulation member arranged between the pair of electrodes and the heater. The pair of electrodes are separated from each other.

When particulate matter is accumulated on the pair of electrodes, a current flows between the pair of electrodes. The current detection part detects the current, and an amount of particulate matter contained in exhaust gas is detected on the basis of the detected current. In the particulate matter detection system B, one of the pair of electrodes is connected to the current detection part.

When the amount of particulate matter accumulated on the pair of electrode exceeds a predetermined amount, the current flowing between the pair of electrodes is saturated. Accordingly, it is necessary to heat the heater, and to remove the accumulated particulate matter from the pair of electrodes. In order to detect this current with high accuracy in the heat energy generation by the heater, the current detection part in the particulate matter detection system B detects a leak current which flows from the heater to the pair of electrodes through the insulation member. Because there is a correlation between a temperature of the insulation member and a leak current, it is possible to detect a temperature of the insulation member, i.e. a temperature of the heater with high accuracy on the basis of the detected leak current.

Recently, there has been considered to detect a sensor failure of the particulate matter detection sensor on the basis of the detected leak current. For example, it can be considered that the insulation member has deteriorated when a large leak current flows. The current detection part detects a leak current which is flowing through a wiring arranged in the particulate matter detection sensor. Accordingly, it is possible to judge that a line disconnection occurs in the particulate matter detection sensor when a weak leak current is flowing.

CITATION LIST

Patent Literature

[Patent document 1] Japanese patent laid open publication No. JP 2012-37373, and
[Patent document 2] Japanese patent laid open publication No. JP 2012-83121.

SUMMARY OF INVENTION

Technical Problem

However, the particulate matter detection system A has a problem in which it is often difficult to detect a correct amount of particulate matter. That is, there is a possible case in which a small amount of particulate matter remains between the pair of electrodes due to unburned particulate matter after a burning process in the burning mode. In this situation, when the burning mode is switched to the detection mode, it is possible to detect an incorrect amount of particulate matter because the particulate matter detection sensor has not been adequately regenerated by the burning process.

Further, there is a possible case in which the particulate matter detection system B does not securely detect an occurrence a sensor failure of the particulate matter detection sensor. That is, only one of the pair of electrodes is connected to the current detection part. For this reason, for example, it is difficult to detect an occurrence of a line disconnection in the other electrode which is not connected to the current detection part.

The present invention has been made in consideration of the foregoing circumstances, and it is an object of the present invention to provide a particulate matter detection system capable of detecting an accurate amount of particulate matter contained in exhaust gas, and to detect an occurrence of a sensor failure of a particulate matter detection sensor in the particulate matter detection system with high accuracy.

Solution to Problem

In accordance with one aspect of the present invention, there is provided a particulate matter detection system having a particulate matter detection sensor, a current detection part and a control circuit part. The particulate matter detection sensor has an accumulation part on which particulate matter contained in exhaust gas is accumulated, a pair of electrodes arranged to be separated from each other on the accumulation part, and a heater part heating the accumulation part. The current detection part is electrically connected to one of the pair of electrodes. The control circuit part is electrically connected to the particulate matter detection sensor and the current detection part. The control circuit part performs a switching control of a detection mode and a burning mode. In the detection mode, the control circuit part prohibits supply of power to the heater part, supplies a voltage to the pair of electrodes, and instructs the current detection part to detect a current which is flowing between the pair of electrodes. In the burning mode, the control circuit part supplies to the heater part a voltage, which is smaller than a voltage supplied between the pair of electrodes in the detection mode, so that the heater part generates heat energy so as to burn particulate matter accumulated between the pair of electrodes. The control circuit part judges that particulate matter remains on the accumulation part, and performs the burning mode again when the current value detected by the current detection part is more than a predetermined current value at a time immediately after the burning mode is switched to the detection mode.

In the particulate matter detection system having the structure previously described, the control circuit part judges that particulate matter remains on the accumulation part, and performs the burning mode again when the current value, detected immediately after the burning mode is switched to the detection mode, is more than the predetermined threshold value. Accordingly, the control circuit part performs the burning mode again when the unburned particulate matter remains on the accumulation part due to insufficient burning. After this burning mode, the control circuit part detects an amount of particulate matter contained in exhaust gas. This makes it possible to avoid the detection of particulate matter under a situation in which some particulate matter remains on the accumulation part, and possible to detect an accurate amount of particulate matter contained in exhaust gas.

As previously described, the present invention provides the particulate matter detection system capable of detecting an amount of particulate matter contained in exhaust gas with high accuracy.

In accordance with another aspect of the present invention, there is provided a particulate matter detection system having a particulate matter detection sensor, a pair of current detection parts, and a control circuit part. The particulate matter detection sensor has an accumulation part on which particulate matter contained in exhaust gas is accumulated, a pair of electrodes arranged to be separated from each other on the accumulation part, a heater part for heating the accumulation part, and an insulation member arranged between the pair of electrodes and the heater part. The pair of current detection parts are electrically connected to the pair of electrodes, respectively. The control circuit part is electrically connected to the particulate matter detection sensor and the pair of current detection parts. The control circuit part instructs the pair of current detection parts to detect a leak current which is flowing from the heater part to the pair of electrodes through the insulation member when the heater part generates heat energy, and the control circuit part judges whether a failure state occurs in the particulate matter detection sensor on the basis of the detected leak current.

Effects of the Present Invention

The particulate matter detection system previously described has the pair of current detection parts. The control circuit part detects a leak current, which is flowing from the heater part generating heat energy to the pair of electrodes through the insulation member, by using the pair of current detection parts, and judges whether a sensor failure occurs in the particulate matter detection sensor on the basis of the detected leak current.

Accordingly, the control circuit part to reliably and securely detect an occurrence of a sensor failure of the particulate matter detection sensor on the basis of both the leak currents detected by the pair of current detection parts. For example, it is possible for the control circuit part to correctly detect an occurrence of a line disconnection of one of the wirings, through which the pair of electrodes are connected to the current detection parts, respectively, even if a line disconnection occurs in one of the wirings.

As previously described, the present invention can provide the particulate matter detection system capable of detecting an occurrence of a sensor failure in the particulate matter detection sensor with high reliability.

In the particulate matter detection system according to the present invention, the current detection parts are electrically connected to the pair of electrodes. This connection state represents both the cases, for example, the current detection parts are always electrically connected to the pair of electrodes, and the current detection parts are electrically connected to the pair of electrodes through a switch when the switch is activated.

BRIEF DESCRIPTION OF DRAWINGS

FIG. 30 is a diagram showing various graphs when the insulation member has deteriorated or the heater part has a short circuit in the particulate matter detection system according to an eighth exemplary embodiment, (a) is a graph showing a temperature of the heater part, (b) is a graph showing a voltage between the pair of electrodes, (c) is a graph showing a detected current value of the first current detection part and (d) is a graph showing a detected current value of the second current detection part.

DESCRIPTION OF EMBODIMENTS

A description will be given of the particulate matter detection system as various exemplary embodiments of the present invention according to the present invention with reference to drawings. For example, the particulate matter detection system is mounted on a diesel vehicle, capable of detecting particulate matter contained in exhaust gas emitted from a diesel engine of a diesel vehicle.

Exemplary Embodiments

First Exemplary Embodiment

A description will be given of the particulate matter detection system according to the first exemplary embodiment with reference to FIG. 1 to FIG. 8.

Figure 3:
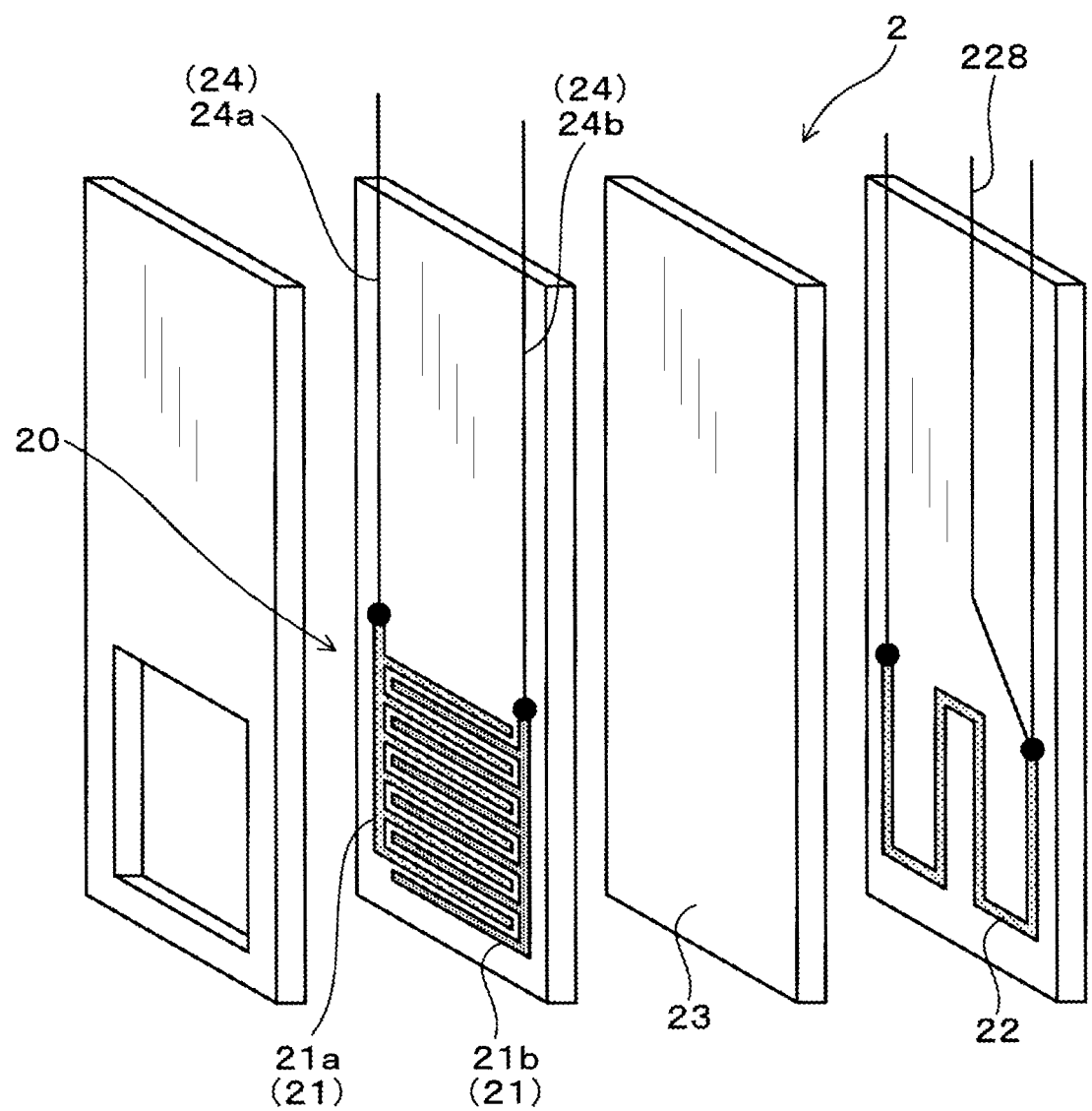
FIG. 3 is a perspective exploded view showing a particulate matter detection sensor in the particulate matter detection system according to the first exemplary embodiment of the present invention.
Figure 8:
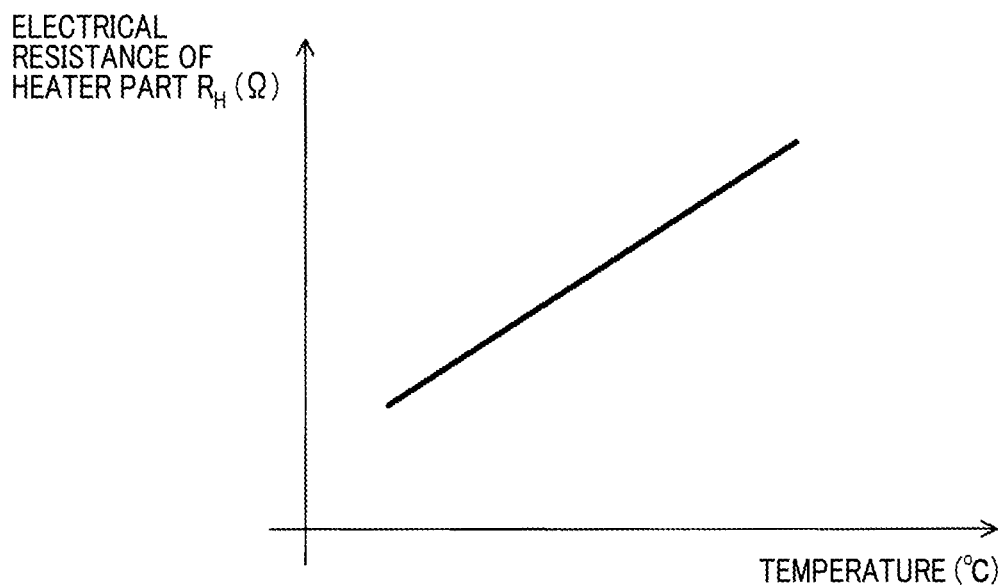
FIG. 8 is a graph showing a relationship between a temperature of the heater part and an electric resistance in the particulate matter detection system according to the first exemplary embodiment of the present invention.

As shown in FIG. 8, the particulate matter detection system 1 according to the first exemplary embodiment has a particulate matter detection sensor 2, a current detection part 3, and a control circuit part 4. As shown in FIG. 3, the particulate matter detection sensor 2 has an accumulation part 20, a pair of electrodes 21 (21a, 21b), and a heater part 22. Particulate matter is accumulated on the accumulation part 20. The pair of electrodes 21 are formed and arranged to separate from each other on the accumulation part 20. The heater part 22 generates heat energy to heat the accumulation part 20.

Figure 1:
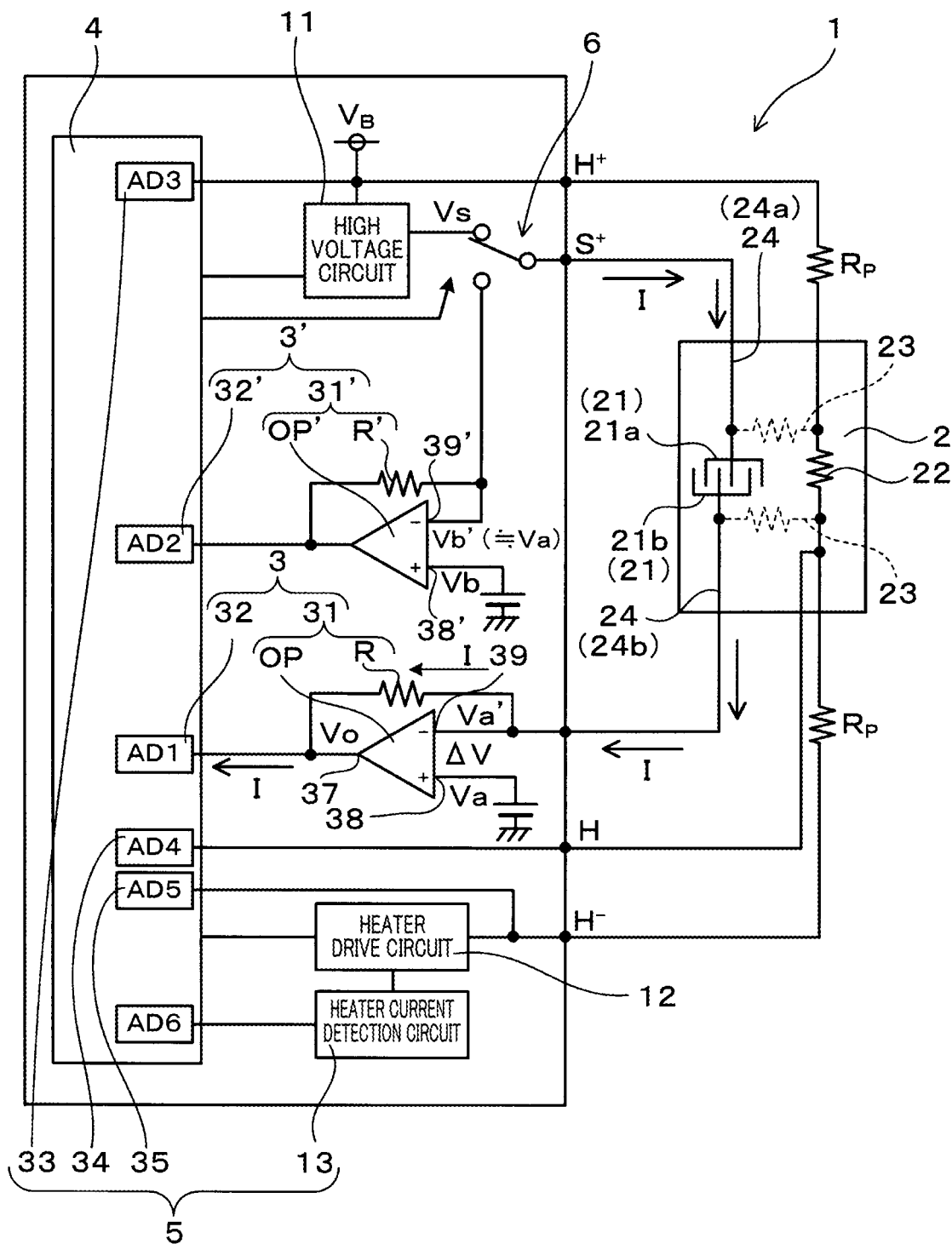
FIG. 1 is a view showing a circuit diagram of a particulate matter detection system in a detection mode according to a first exemplary embodiment of the present invention.

The electrode 21 is composed of a first electrode 21a and a second electrode 21b. As shown in FIG. 1, the second electrode 21b is connected to the current detection part 3. The first electrode 21a is connected to a supplemental current detection part 3'. The control circuit part 4 is connected to the particulate matter detection sensor 2 and the current detection part 3.

Figure 2:
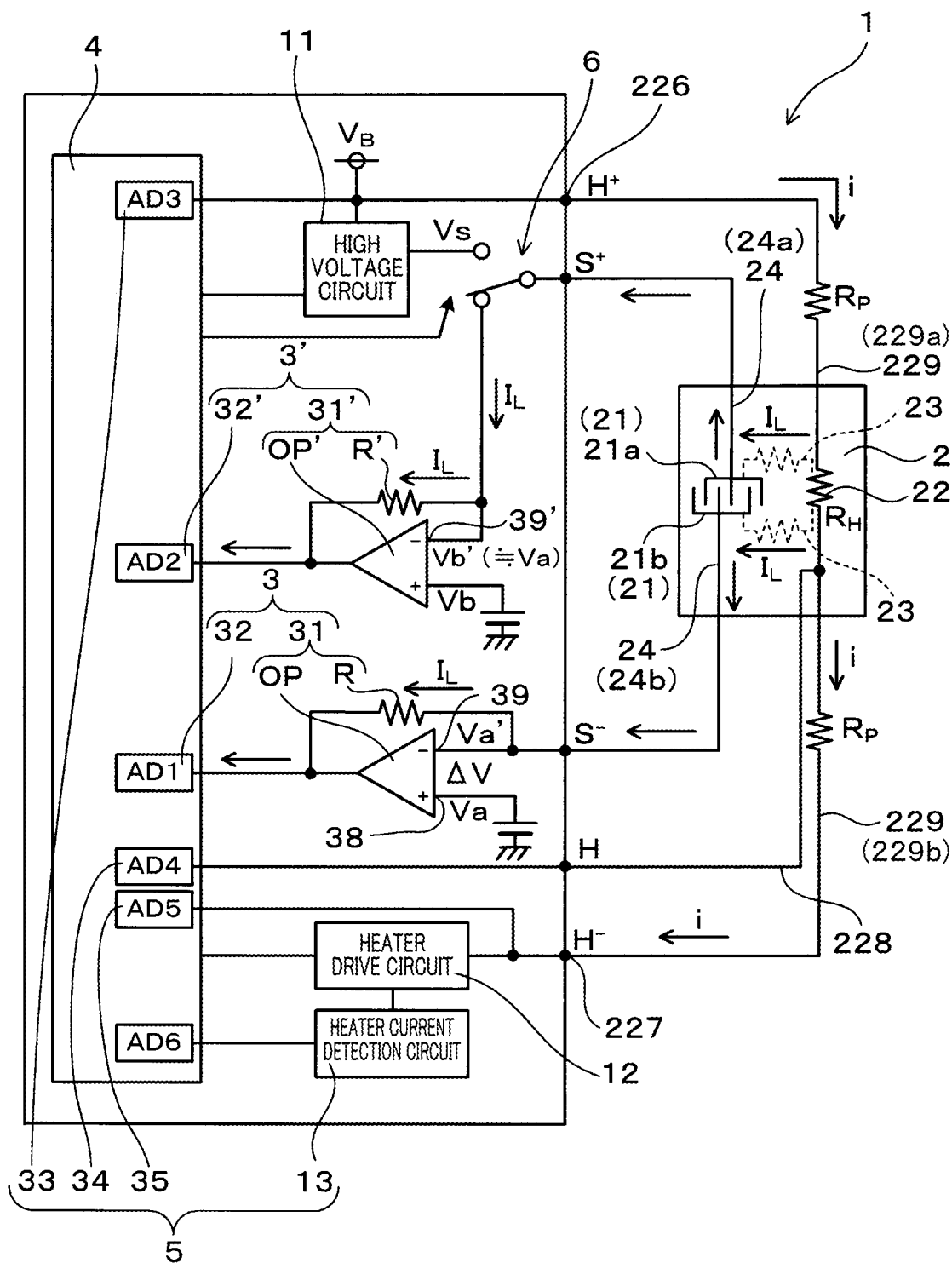
FIG. 2 is a view showing a circuit diagram of a particulate matter detection system in a burning mode according to a first exemplary embodiment of the present invention.

The control circuit part 4 is configured to perform the switching operation of the detection mode (see FIG. 1) and the burning mode (see FIG. 2). As shown in FIG. 1, in the detection mode, the control circuit part 4 prohibits supply of power to the heater part 22, and supplies the voltage Vs to the pair of electrodes 21. This makes it possible to generate an electric field between the first electrode 21a and the second electrode 21b so as to collect particulate matter between those electrodes 21a, 21b by electrostatic force caused by the electric field. When particulate matter is accumulated between the first electrode 21a and the second electrode 21b, a current I flows between the first electrode 21a and the second electrode 21b. The current detection part 3 detects this current I.

In the burning mode, the control circuit part 4 instructs the heater part to generate heat energy so as to burn the particulate matter accumulated on the accumulation part 20 while supplying the voltage between the first electrode 21a and the second electrode 21b, which is smaller than the voltage supplied between the first electrode 21a and the second electrode 21b in the detection mode.

through the description, the burning mode will also be called as "a regeneration mode" because the particulate matter detection sensor is regenerated in the regeneration mode.

The control circuit part 4 judges that some particulate matter has remained on the accumulation part 20 when the current I detected immediately after the burning mode is switched to the detection mode is more than a predetermined threshold value Ib. The control circuit part 4 performs the burning mode again.

For example, it is possible to mount the particulate matter detection system 1 according to the first exemplary embodiment to a diesel vehicle. The control circuit part 4 is composed of a microcomputer. A microcomputer has a plurality of A/D converters. The particulate matter detection system 1 according to the first exemplary embodiment has a high voltage circuit 11, a switch 6, and the supplemental current detection part 3, a heater drive circuit 12, and a heater current detection circuit 13.

As shown in FIG. 1, the current detection part 3 is composed of a current voltage conversion circuit 31 and a voltage detection circuit 32. The current voltage conversion circuit 31 is composed of an operational amplifier OP and a resistance R. The resistance R is arranged between an inverting input terminal 39 and an output terminal 37 of the operational amplifier OP. The voltage detection circuit 32 is composed of an A/D converter (AD1). The voltage detection circuit 32 detects an output voltage Vo of the operational amplifier OP.

A non-inverting input terminal 38 of the operational amplifier OP is maintained at a predetermined voltage (hereinafter, referred to as the non-inverting input terminal voltage Va). The operational amplifier OP has a virtual short circuit as one of characteristics thereof, with which a voltage (hereinafter, referred to as the inverting input terminal voltage Va') of the inverting input terminal 39 is substantially equal to the non-inverting input terminal voltage Va.

In the first exemplary embodiment, the control circuit part 4 prohibits supply of power to the heater part 22 in the detection mode, and as shown in FIG. 1, instructs the switch 6 to connect the first electrode 21a to the high voltage circuit 11. The voltage Vs is supplied to the electrode 21 composed of the first electrode 21a and the second electrode 21b, particulate matter is collected and accumulated on the accumulation part 20, i.e. between the first electrode 21a and the second electrode 21b, and the current I is thereby flowing in the electrode 21. The current detection part 3 detects this current I. The control circuit part 4 detects an amount of particulate matter contained in exhaust gas on the basis of the detected current I.

The current I is flowing through the resistance R, not flowing into the inverting input terminal 39 of the operational amplifier OP. the voltage is reduced at the resistance R by RI. Accordingly, it is possible to express the output voltage Vo of the operational amplifier OP by using the equation of Vo=Va'−RI. This equation can be converted to the following equation (1).

$$I=(Va'-Vo)/R \qquad (1).$$

The control circuit part 4 has stored the value of the inverting input terminal voltage Va' and the value of the resistance R. The control circuit part 4 is configured to calculate the current I by using the equation (1), and to calculate an amount of particulate matter contained in exhaust gas on the basis of the calculated current I.

The supplemental current detection part 3' has the same structure of the current detection part 3, i.e. has a current voltage conversion circuit 31' and a voltage detection circuit 32'. A voltage of the inverting input terminal 39 in the supplemental current detection part 3' is maintained at a voltage Vb'. A non-inverting input terminal voltage Vb' of the supplemental current detection part 3' is substantially equal to the inverting input terminal voltage Va' of the current detection part 3.

On the other hand, in the first exemplary embodiment shown in FIG. 2, the control circuit part 4 performs the control operation of the switch 6 in the burning mode so as to connect the first electrode 21a to the supplemental current detection part 3'. This state drives the heater drive circuit 12 to allow the heater part 22 to generate heat energy.

Further, the particulate matter detection system 1 according to the first exemplary embodiment has a temperature detection part 5 capable of detecting a temperature of the heater part 22. The temperature detection part 5 is composed of three A/D converters 33 to 35, and the heater current detection circuit 13. The temperature detection part 5 detects a heater resistance $R_H$ which is an electrical resistance of the heater part 22, and calculates a temperature of the heater part 22 on the basis of the detected heater resistance $R_H$.

As shown in FIG. 8, because there is a constant relationship between a temperature of the heater part 22 and the heater resistance $R_H$, the temperature detection part 5 calculates a temperature of the heater part 22 on the basis of the detected heater resistance $R_H$.

A description will now be given of detailed explanation of the method of detecting a temperature of the heater part 22. As shown in FIG. 2, each of heater wirings 229a, 229b has a parasitic wiring resistance Rp. Because the heater wirings 229a, 229b have the same length, the heater wirings 229a, 229b have the same parasitic wiring resistance Rp, respectively.

In the first exemplary embodiment, the temperature detection part 5 detects a voltage $V_H$ between two terminals 226 and 227 connected to the heater wiring 229 by using the third A/D converter 33 and the fifth A/D converter 35. Further, the heater current detection circuit 13 in the temperature detection part 5 detects a current i which is flowing in the heater part 22. The temperature detection part 5 detects a total resistance Ra of the heater resistance $R_H$ and the two wiring resistances Rp on the basis of the detected voltage $V_H$ and the detected current i. It is possible to express the total resistance Ra by using the following equation (2), $$Ra = V_H/i = R_H + 2Rp \quad (2).$$

In the first exemplary embodiment, the temperature detection part 5 detects the voltage Vp at the parasitic wiring resistance Rp of the heater wiring 229 by using the fourth A/D converter and the fifth A/D converter. The temperature detection part 5 calculates the parasitic wiring resistance Rp of the heater wiring 229b on the basis of the detected voltage Vp and the detected current i by using the following equation (3).

$$Rp = Vp/i \quad (3).$$

The fourth A/D converter 34 is connected to a sensing wiring 228. This sensing wiring 228 is connected to a node near the heater part 22. The fourth A/D converter 34 detects a voltage supplied to the other heater wiring 229b through the sensing wiring 228. Although the sensing wiring 228 has a parasitic resistance, a current does not flow in the sensing wiring 228. Accordingly, no voltage drop occurs in the sensing wiring 228, and this makes it possible to detect the voltage Vp with high accuracy.

In the first exemplary embodiment, the temperature detection part 5 detects the total resistance Ra and the parasitic wiring resistance Rp by using the equations (2) and (3) previously described, and calculates the heater resistance $R_H$ by using the following equation. That is, the temperature detection part 5 subtracts the two parasitic wiring resistances Rp from the total resistance Ra. This makes it possible for the temperature detection part 5 to obtain the correct heater resistance $R_H$ without the influence of the wiring resistance Rp, and to calculate a correct temperature of the heater part 22, where $R_H = Ra - 2 Rp$.

Figure 4:
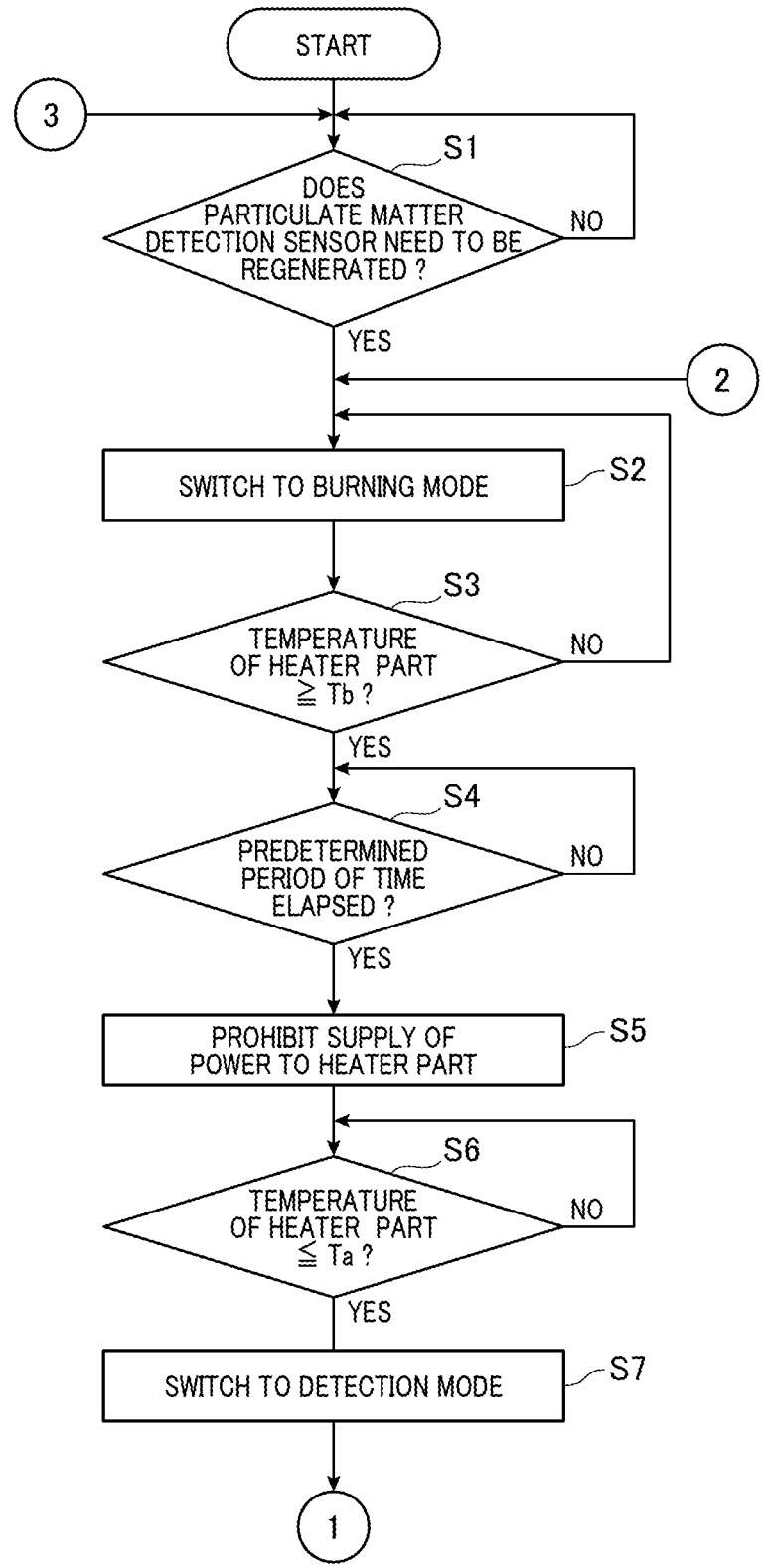
FIG. 4 is a flow chart showing an action of a control circuit part in the particulate matter detection system according to the first exemplary embodiment of the present invention.

Next, a description will be given of the action of the control circuit part 4. As shown in FIG. 4, the control circuit part 4 detects whether it is necessary to regenerate the particulate matter detection sensor 2 (step S1). For example, the control circuit part 4 detects a current I which is flowing between the electrodes 21. When the current I has been saturated, the control circuit part 4 determines the execution of regenerating the particulate matter detection sensor 2 (YES in step S1).

When the detection result in step S1 (YES in step S1), the operation flow progresses to step S2. The control circuit part 4 switches from the detection mode to the burning mode. That is, the control circuit part 4 instructs the switch 6 to connect the first electrode 21a to the supplemental current detection part 3' (see FIG. 2) in order for the heater part 22 to generate heat energy.

The operation flow progresses to step S3. In step S3, the control circuit part 4 detects whether a temperature of the heater part 22 has adequately risen. The control circuit part 4 detects the temperature of the heater part 22, and detects whether the detected temperature of the heater part 22 is more than the predetermined temperature value Tb. When the detection result in step S3 indicates Yes, i.e. indicates that the temperature of the heater part 22 is more than the predetermined temperature value Tb, the operation flow progresses to step S4. In step S4, the control circuit part 4 detects whether a predetermined period of time has been elapsed. As previously described, the control circuit part 4 performs the burning process of burning the particulate matter detection sensor 2 accumulated on the accumulation part 20 by maintaining the high temperature state of the heater part 22 in the predetermined period of time.

When the detection result in step S4 indicates Yes, the operation flow progresses to step S5. In step S5, the temperature detection part 5 prohibits supply of power to the heater part 22. The operation flow progresses to step S6. In step S6, the temperature detection part 5 detects whether a temperature of the heater part 22 has been adequately reduced. That is, the control circuit part 4 supplies power to the heater part 22 within a short period of time, and detects a temperature of the heater part 22. The control circuit part 4 detects whether the detected temperature of the heater part 22 is less than the predetermined temperature value Ta. When the detection result indicates Yes, i.e. the detected temperature of the heater part 22 is less than the predetermined temperature value Ta, the operation flow progresses to step S7.

Figure 5:
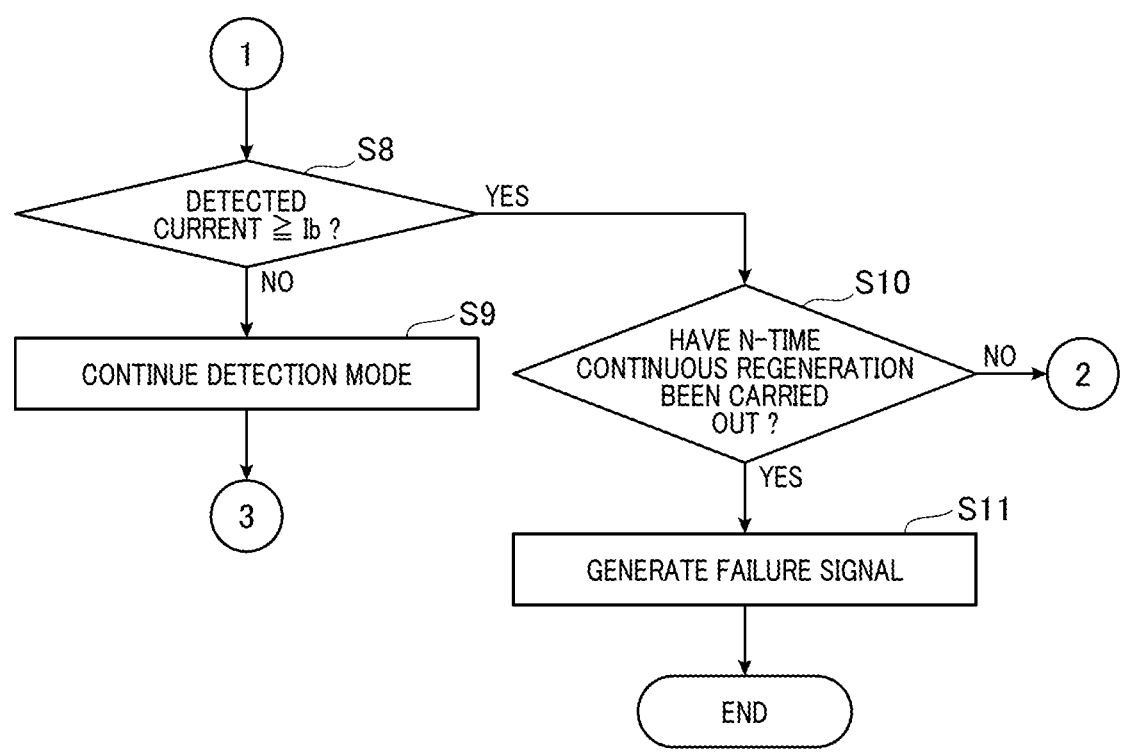
FIG. 5 is a view showing an additional process of the control circuit part following the processes in the flow chart shown in FIG. 4.

In step S7, the control circuit part 4 switches to the detection mode. That is, the control circuit part 4 instructs the switch 6 to connect the first electrode 21a to the high voltage circuit 11 (see FIG. 1). In addition to this control, the control circuit part 4 instructs the current detection part 3 to detect the current I. As shown in FIG. 5, the operation flow progresses to step S8. In step S8, the control circuit part 4 detects whether the detected current I immediately after the burning mode is switched to the detection mode is more than the predetermined threshold value Ib. When unburned particulate matter has remained on the accumulation part 20 due to insufficient burning and the burning mode is switched to the detection mode, a large current flows between the first electrode 21a and the second electrode 21b. Accordingly, the control circuit part 4 can judge whether particulate matter has remained on the accumulation part 20 on the basis of the detected current value I.

In step S8, the detection result indicates Yes, i.e. indicates particulate matter has remained on the accumulation part 20, the operation flow progresses to step S10. In step S10, the control circuit part 4 detects whether the number of times that the burning mode has continuously performed is more than a predetermined number. When the detection result in step S10 indicates No, the operation flow progresses to step S2. The control circuit part 4 performs the burning mode again.

As previously described, when the control circuit part 4 detects that particulate matter has remained on the accumulation part 20, the control circuit part 4 performs the burning mode again so as to completely burn the remained particulate matter. That is, the control circuit part 4 performs the detection mode after the particulate matter has been burned adequately.

Further, in step S10, when the number of times that the burning mode has continuously performed is more than the predetermined number (Yes), the control circuit part 4 judges that a heater failure occurs in the heater part 22 of the particulate matter detection sensor 2. The operation flow progresses to step S11, the control circuit part 4 generates a failure signal. The control circuit part 4 instructs the user to replace the particulate matter detection sensor 2 in a sensor failure with a new particulate matter detection sensor.

In step S8, when the detection result indicates No, i.e. indicates that no particulate matter remains on the accumulation part 20, the operation flow progresses to step S9. In step S9, the control circuit part 4 continues the detection mode. After step S9, the operation flow returns to step S1 (see FIG. 4).

Next, a description will be given of the explanation of the time-elapsed graphs with reference to FIG. 6 and FIG. 7. Those graphs show a relationship between a temperature of the heater part 22, a voltage of the first electrode 21a, a current value detected by the supplemental current detection part 3', and a current value I detected by the current detection part 3.

Figure 6:
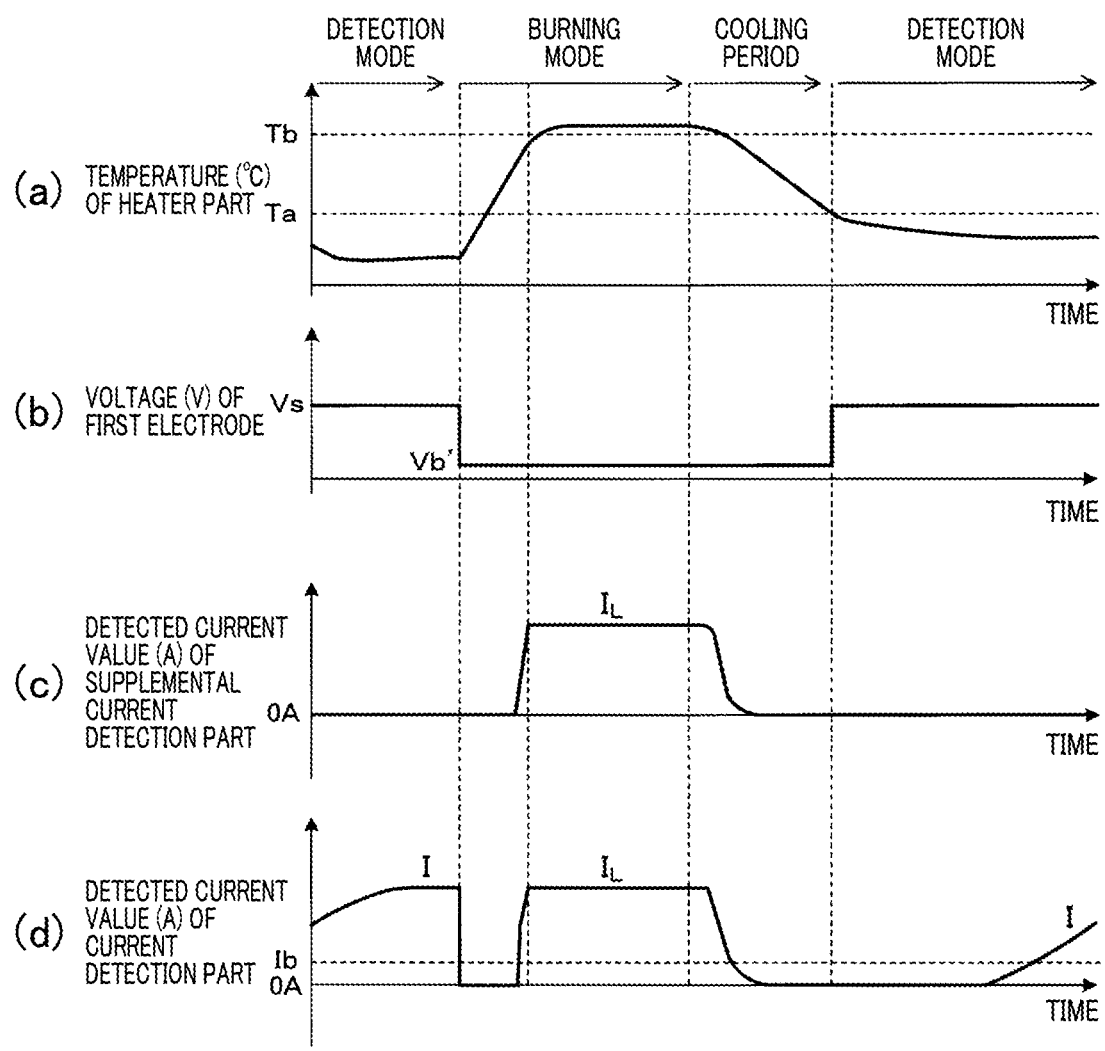
FIG. 6 is a diagram showing various graphs when particulate matter is adequately burned in the particulate matter detection system according to the first exemplary embodiment of the present invention, (a) is a graph showing a temperature of a heater part, (b) is a graph showing a voltage potential of a first electrode, (c) is a graph showing a detected current value of a first current detection part and (d) is a graph showing a detected current value of a second current detection part.

FIG. 6 shows graphs when particulate matter accumulated on the accumulation part 22 has been adequately burned and eliminated in the burning mode.

As shown in FIG. 6, in the detection mode, a temperature of the heater part 22 is relatively low (see FIG. 6(a)). Because the first electrode 21a is connected to the high voltage circuit 11 (see FIG. 1), the voltage of the first electrode 21a becomes substantially equal to the voltage Vs of the high voltage circuit 11 (see FIG. 6(b)). In addition, because the first electrode 21a is not connected to the supplemental current detection part 3' in the detection mode, the supplemental current detection part 3' does not detect any current. Because particulate matter is gradually accumulated on the accumulation part 22 after repetition of the detection mode, a current flowing between the first electrode 21a and the second electrode 21b gradually increases. Accordingly, the detection value of the current detection part 3 gradually increases (see FIG. 6(d)).

After the detection mode is switched to the burning mode, a temperature of the heater part 22 gradually increases (see FIG. 6(a)). When the temperature of the heater part 22 has adequately increased, the particulate matter accumulated on the accumulation part 20 is burned. Because the temperature of the heater part 22 increases, a temperature of the insulation member 23 (see FIG. 3) arranged between the heater part 22 and the electrode 21 increases, and the electrical resistance of the insulation member 23 is reduced. For this reason, a leak current $I_L$ is flowing from the heater part 22 to the first electrode 21a and the second electrode 21b (see FIG. 2). The current detection part 3 and the supplemental current detection part 3' detects this leak current $I_L$ (see FIG. 6(c)).

As shown in FIG. 6, after the burning mode is finished, the temperature of the heater part 22 is gradually reduced (see FIG. 6(a)). After the temperature of the heater part 22 has been adequately reduced, the control circuit part 4 switches to the detection mode. As shown in FIG. 6(d), because no particulate matter has remained on the accumulation part 20 due to the adequate burning in the burning mode, no current I flows immediately after the burning mode is switched to the detection mode. The current I starts to flow and gradually increases between the first electrode 21a and the second electrode 21b when the time has elapsed and particulate matter is accumulated on the accumulation part 20 after the burning mode is switched to the detection mode.

Figure 7:
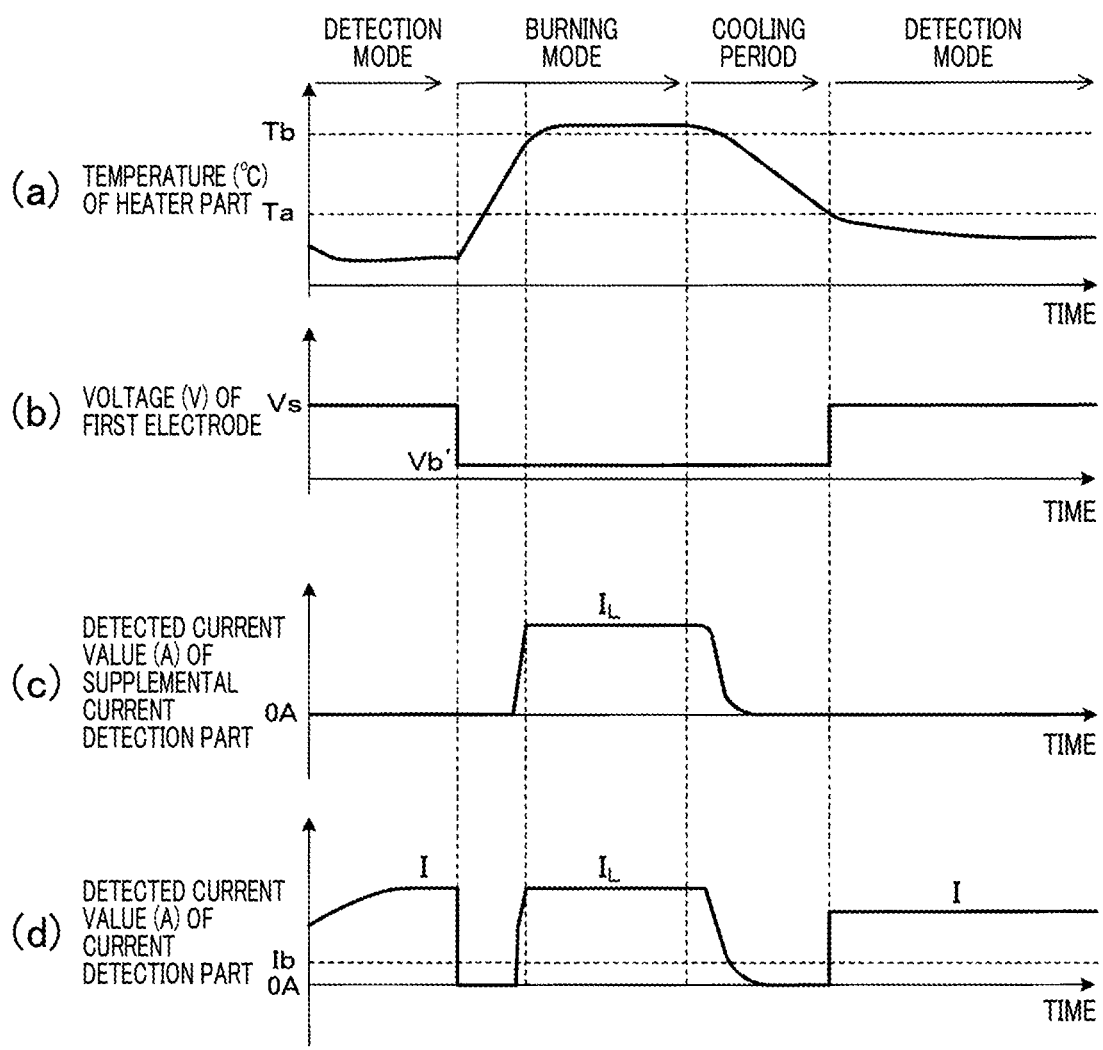
FIG. 7 is a diagram showing various graphs when unburned particulate matter remains in the particulate matter detection system according to the first exemplary embodiment of the present invention, (a) is a graph showing a temperature of a heater part, (b) is a graph showing a voltage potential of a first electrode, (c) is a graph showing a detected current value of a first current detection part and (d) is a graph showing a detected current value of a second current detection part.

On the other hand, as shown in FIG. 7, when unburned particulate matter has remained in the burning mode, the current I rapidly flows immediately after the burning mode is switched to the detection mode (see FIG. 7(d)). Because unburned particulate matter having conductive characteristics has remained between the first electrode 21a and the second electrode 21b, and the voltage Vs is supplied between the first electrode 21a and the second electrode 21b. The current detection part 3 detects this current I which is more than the predetermined threshold value Ib (see FIG. 7(d)).

A description will be given of the action and effects of the particulate matter detection system according to the first exemplary embodiment. As shown in FIG. 5, the control circuit part 4 is configured to judge that particulate matter has remained on the accumulation part 20 when the detected current value I is more than the predetermined threshold value Ib immediately after the burning mode is switched to the detection mode. Further, the control circuit part 4 is configured to perform the burning mode again (step S8, S10, S2). When unburned particulate matter has remained on the accumulation part 20 due to insufficient burning, the control circuit part 4 performs the burning mode again so as to completely burn the particulate matter remained on the accumulation part 20 and eliminate it from the accumulation part 20, and then detects an amount of particulate matter contained in exhaust gas. This control makes it possible to suppress execution of the detection process of detecting an amount of particulate matter contained in exhaust gas, and to detect a correct amount of particulate matter contained in exhaust gas with high accuracy.

As shown in FIG. 5, the control circuit part 4 in the particulate matter detection system according to the first exemplary embodiment is configured to judge that the particulate matter detection sensor 2 is in a sensor failure when the number of times that the burning mode has continuously performed is more than the predetermined number so as to remove particulate matter remained on the accumulation part 20 (step S8, S10). This makes it possible to correctly detect occurrence of a sensor failure of the particulate matter detection sensor 2, and to instruct the user to replace the particulate matter detection sensor 2 with a new particulate matter detection sensor.

Further, as shown in FIG. 4, the control circuit part 4 in the particulate matter detection system according to the first exemplary embodiment is configured to switch to the detection mode after the temperature of the heater part 22 detected by the temperature detection part 5 is smaller than the predetermined temperature value Ta after the burning mode is finished (step S6, S7).

As previously described, in a high temperature situation, the leak current $I_L$ is flowing from the heater part 22 to the electrodes 21. Under this situation in which the heater part 22 is at a high temperature and the leak current $I_L$ is flowing, when the control circuit part 4 switches to the detection mode from the burning mode, it becomes difficult for the control circuit part 4 to judges whether the current value detected by the current detection part 3 corresponds to the leak current $I_L$ or the current I which is flowing in the electrodes 21, and the control circuit part 4 is difficult to correctly judge whether unburned particulate matter has remained on the accumulation part 20. On the other hand, because the control circuit part 4 according to the first exemplary embodiment switches to the detection mode after the temperature of the heater part 22 has been reduced, and no leak current $I_L$ flows, it is possible for the control circuit part 4 to correctly detect the current I flowing between the electrodes 21, and to detect whether particulate matter has remained on the accumulation part 20 with high accuracy.

As previously described in detail, the first exemplary embodiment provides the particulate matter detection system capable of detecting an amount of particulate matter contained in exhaust gas with higher accuracy.

Although the temperature detection part 5 in the first exemplary embodiment detects an electrical resistance of the heater part 22 so as to obtain a temperature of the heater part 22, the concept of the present invention is not limited by this. It is acceptable to use another dedicated temperature sensor so as to directly detect a temperature of the heater part 22.

Second Exemplary Embodiment

A description will now be given of the particulate matter detection system according to a second exemplary embodiment with reference to FIG. 9 and FIG. 10. The same components, used in the drawings, etc., between the second exemplary embodiment and the first exemplary embodiment will be referred with the same reference numbers and characters. The explanation of the same components is omitted for brevity.

The second exemplary embodiment provides a modification of the control circuit part 4 in the particulate matter detection system according to the first exemplary embodiment. FIG. 9 is a flow chart showing the processes performed by the control circuit part 4. The flow chart shown in FIG. 9 shows the processes which follow step S7 shown in FIG. 4 in the explanation of the first exemplary embodiment. The processes in step S8 to S10 are the same as those in the first exemplary embodiment. The explanation of the same processes is omitted here.

In the second exemplary embodiment, when the judgment result in step S8 indicates No, i.e. the control circuit part 4 judges that the current I detected by the current detection part 3 immediately after the burning mode is switched to the detection mode is less than the predetermined threshold value Ib, and no particulate matter remains on the accumulation part 20, the operation flow progresses to step S81.

In step S81, the control circuit part 4 detects whether the wiring 24 of the particulate matter detection sensor 2 is grounded, i.e. in a short circuit to GND. That is, as shown in FIG. 1, the inverting input terminal 39 of the operational amplifier OP in the current detection part 3 is maintained at a positive voltage (i.e. at the inverting input terminal voltage Va'). Accordingly, when the wiring 24 is grounded to GND, the current I flows in a direction which is a reverse direction of the usual flowing direction. For example, as shown in FIG. 10, when the first wiring 24a is grounded to GND at timing t1, the current detected by the supplemental current detection part 3' becomes a negative value (see FIG. 10(*c*)). Similarly, when the second wiring 24b is grounded to GND at timing t2, the current detected by the current detection part 3 becomes a negative value (see FIG. 10(*d*)).

Figure 9:
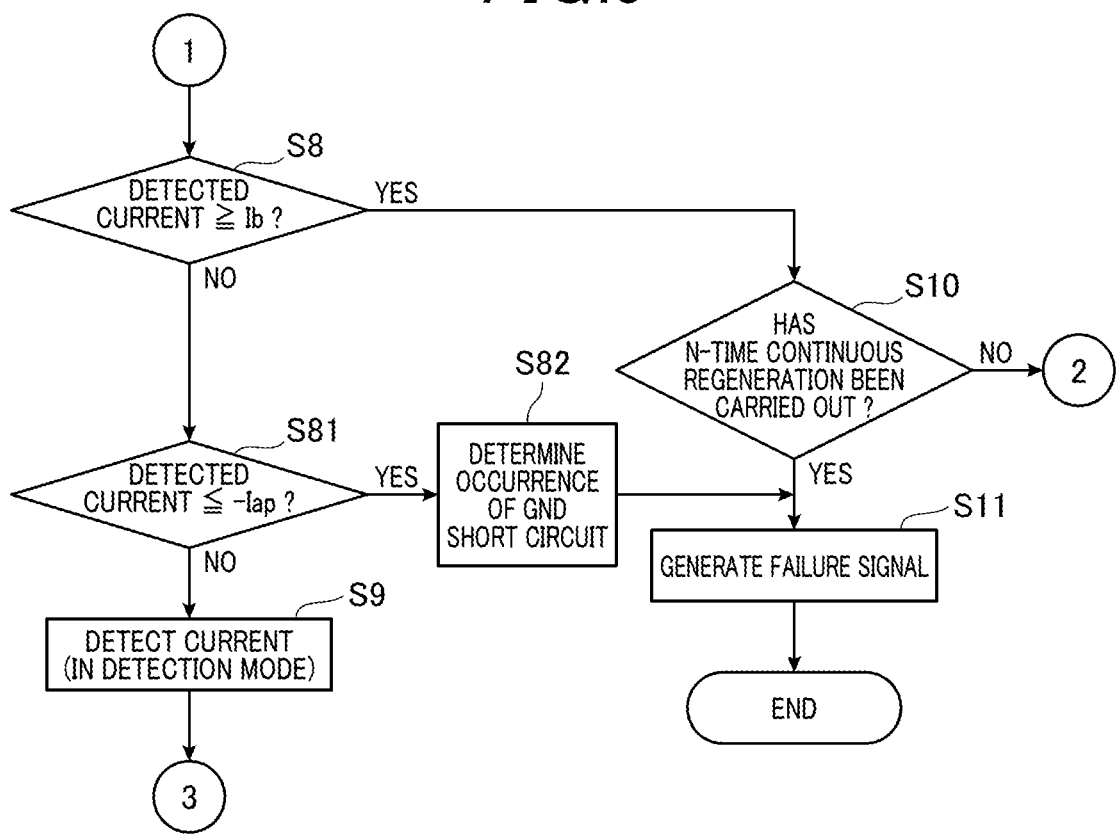
FIG. 9 is view showing a part of the flow chart of the control circuit part in the particulate matter detection system according to a second exemplary embodiment of the present invention.
Figure 10:
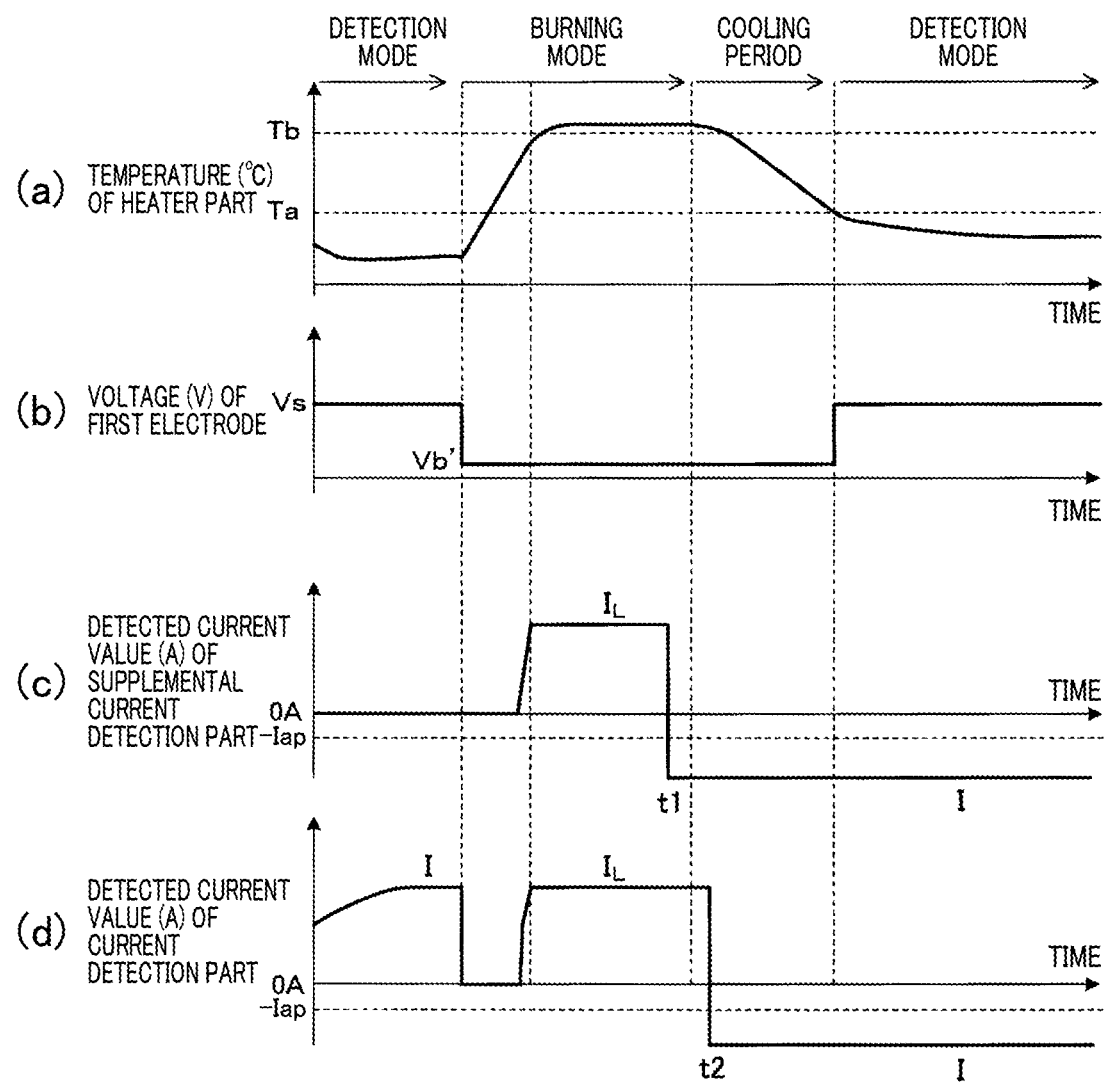
FIG. 10 is a diagram showing various graphs when a first wiring and a second wiring are grounded GND in the particulate matter detection system according to the second exemplary embodiment, (a) is a graph showing a temperature of the heater part, (b) is a graph showing a temperature of the first electrode, (c) is a graph showing a detected current value of the first current detection part and (d) is a graph showing a detected current value of the second current detection part.

As shown in FIG. 9, in step S81, because the current I flows in a reverse direction, the control circuit part 4 detects whether the current I becomes smaller than a predetermined current value −Iap. When the detection result indicates Yes, the operation flow progresses to step S82. In step S82, the control circuit part 4 generates a failure signal so as to instruct the user to replace the particulate matter detection sensor 2 with a new particulate matter detection sensor.

In addition to the features previously described, the particulate matter detection system according to the second exemplary embodiment has the same structure, action and effects as the particulate matter detection system according to the first exemplary embodiment.

A description will now be given of the particulate matter detection system according to a third exemplary embodiment with reference to FIG. 11 to FIG. 14.

Figure 12:
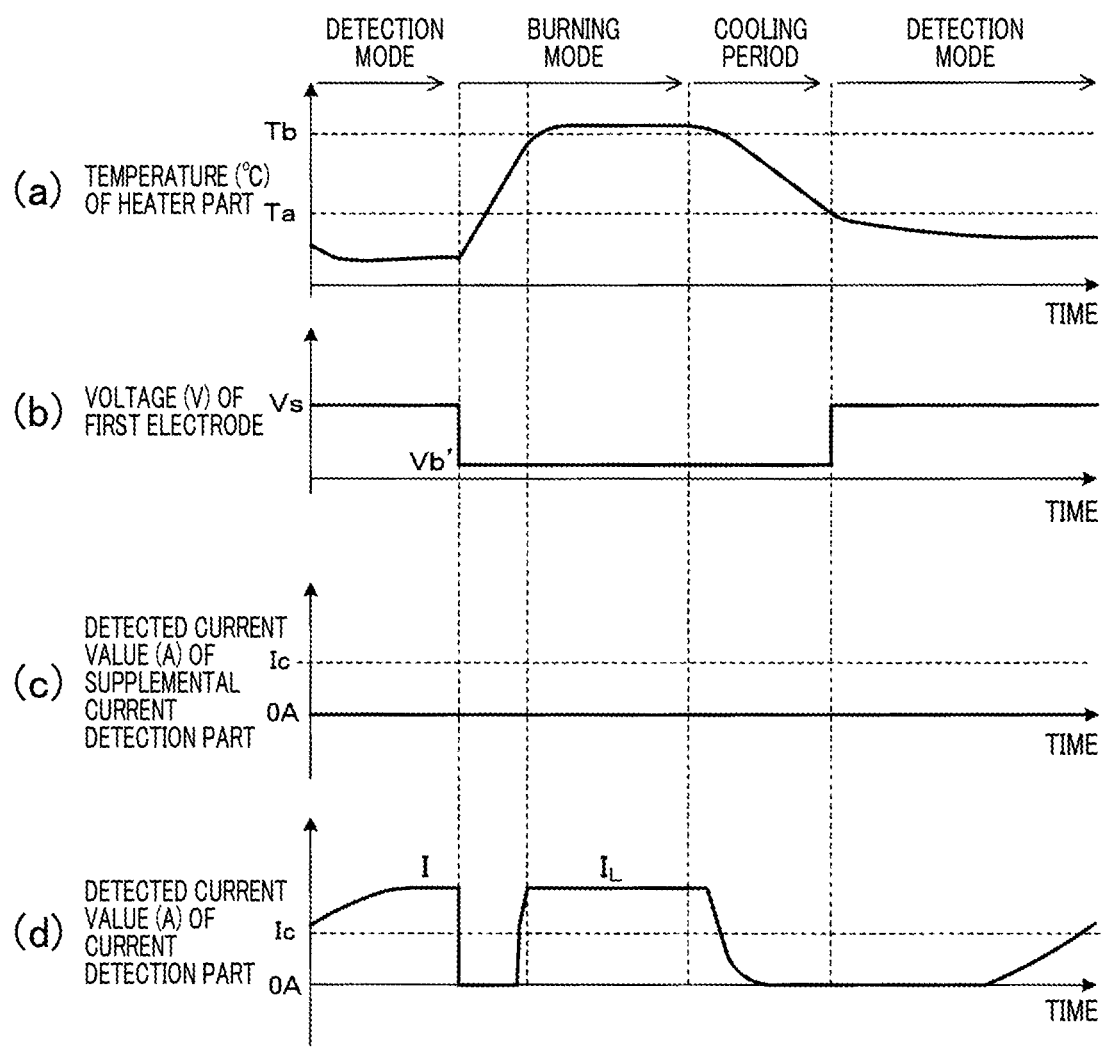
FIG. 12 is a diagram showing various graphs when a line disconnection occurs in the first wiring in the particulate matter detection system according to the third exemplary embodiment, (a) is a graph showing a temperature of the heater part, (b) is a graph showing a voltage of the first electrode, (c) is a graph showing a detected current value of the first current detection part and (d) is a graph showing a detected current value of the second current detection part.

The third exemplary embodiment provides a modification of the control circuit part 4 in the particulate matter detection system according to the first exemplary embodiment. In the burning mode, etc., the control circuit part 4 in the particulate matter detection system according to the third exemplary embodiment detects the leak current $I_L$ which is flowing from the heater part 22 to the electrodes 21 by using the current detection part 3, etc., and judges whether the particulate matter detection sensor 2 is in a sensor failure on the basis of the detected leak current $I_L$. For example, if a line disconnection occurs in the first wiring 24a (see FIG. 3), the leak current $I_L$ does not flow in the first wiring 24a. Accordingly, as shown in FIG. 12(*c*), the supplemental current detection part 3' does not detect the leak current $I_L$ in the burning mode, the leak current $I_L$ becomes less than a predetermined judgment value Ic. In this case, it is possible for the control circuit part 4 to judge that a line disconnection occurs in the first wiring 24a.

Figure 13:
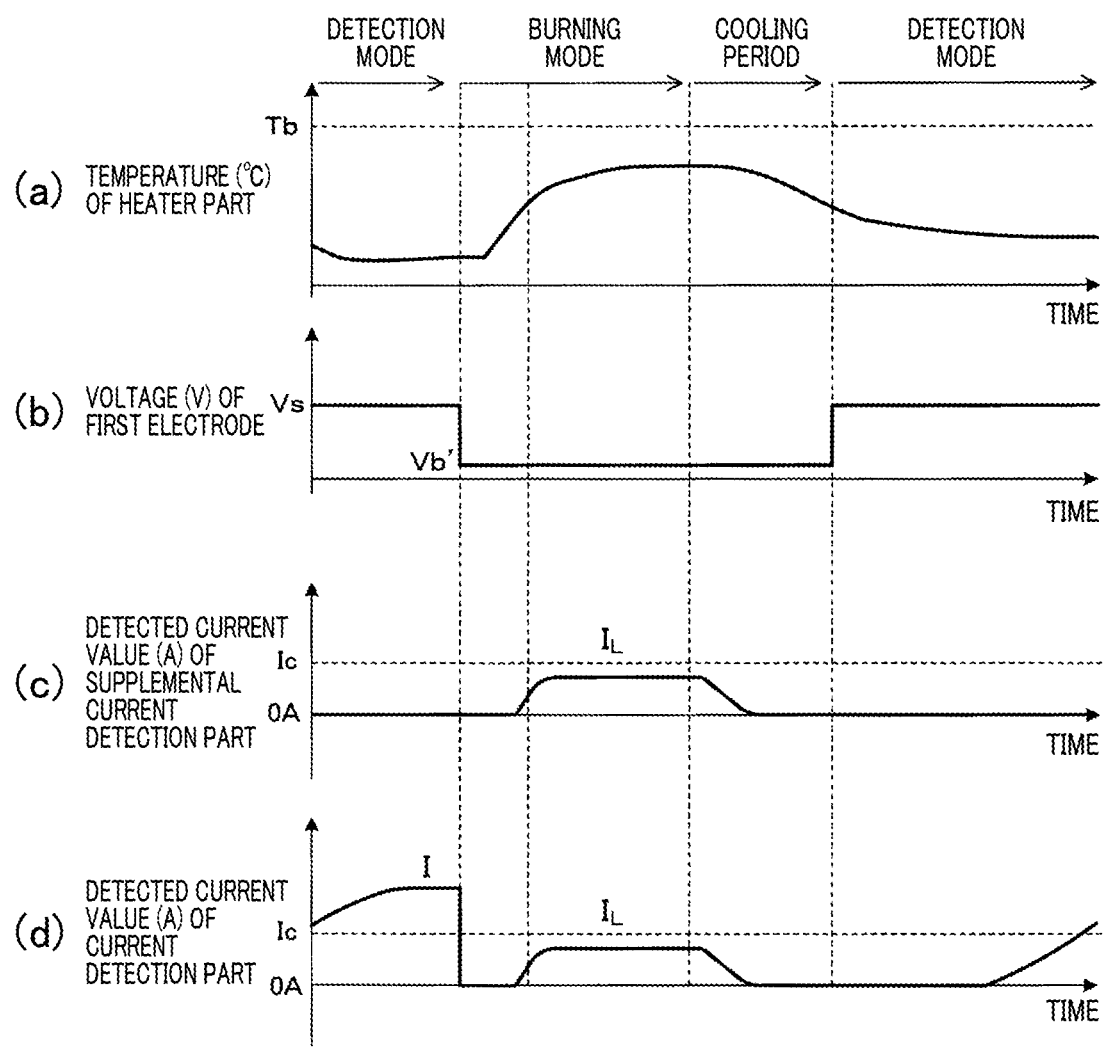
FIG. 13 is a diagram showing various graphs regarding the particulate matter detection system according to the third exemplary embodiment, (a) is a graph showing a temperature of the heater part, (b) is a graph showing a voltage of the first electrode, (c) is a graph showing a detected current value of the first current detection part and (d) is a graph showing a detected current value of the second current detection part.

Further, when the heater part 22 in the particulate matter detection sensor 2 is in a sensor failure, a temperature of the heater part 22 does not adequately increase in the burning mode and a temperature of the insulation member 23 does not adequately increase. Accordingly, an electrical resistance of the insulation member 23 does not adequately reduce, and as shown in FIG. 13(*c*), and FIG. 13(*d*), the leak current $I_L$ does not adequately flow in the burning mode.

Accordingly, the leak current $I_L$ in the burning mode becomes smaller than a predetermined judgment value Ic. Both the leak current $I_L$ detected by the current detection part 3 and the leak current $I_L$ detected by the supplemental current detection part 3' are smaller than the predetermined judgment value Ic (see FIG. 13(*c*) and FIG. 13(*d*)), it is possible for the control circuit part 4 to determine that a heater failure occurs in the heater part 22.

Figure 14:
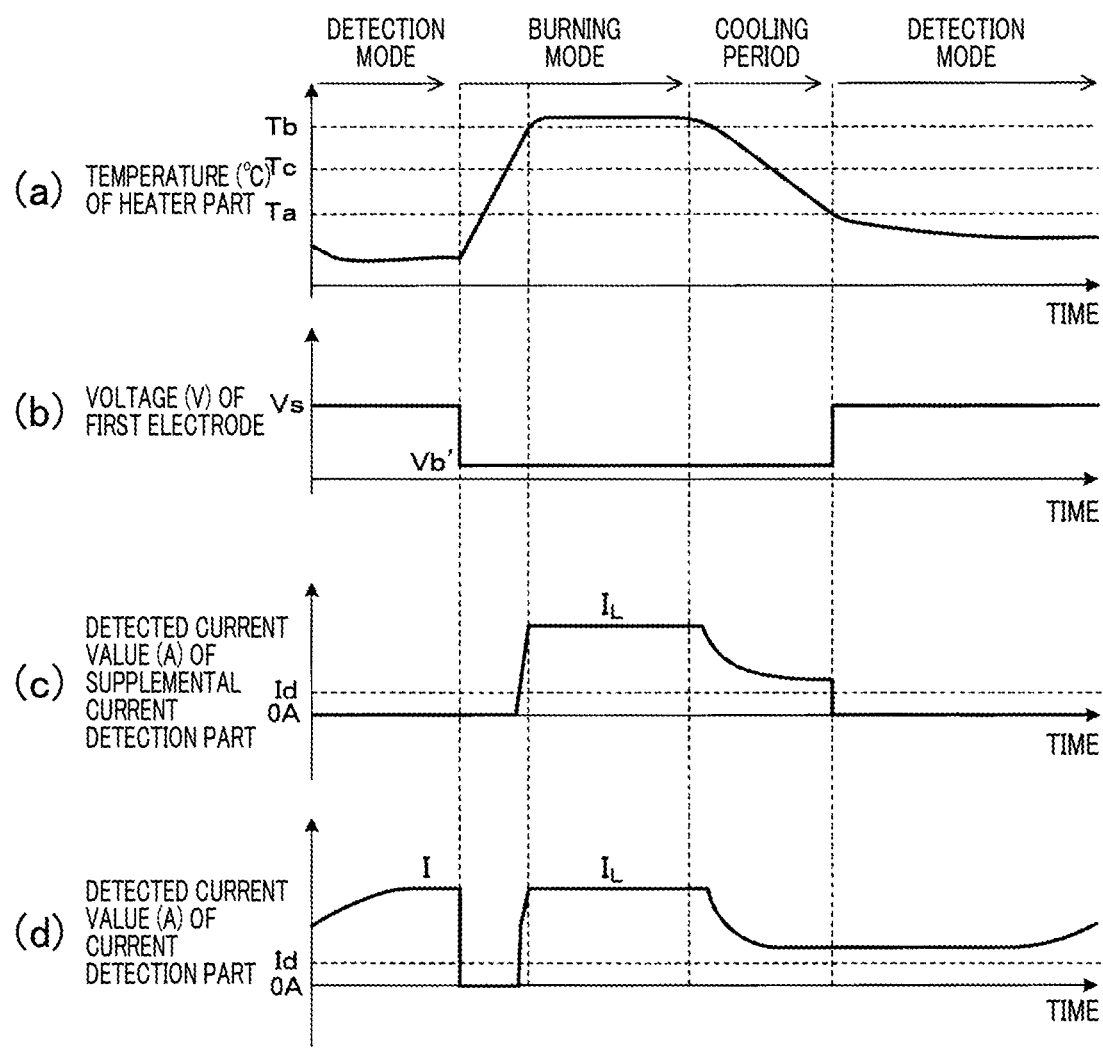
FIG. 14 is a diagram showing various graphs when an insulation member has deteriorated in the particulate matter detection system according to the third exemplary embodiment, (a) is a graph showing a temperature of the heater part, (b) is a graph showing a voltage of the first electrode, (c) is a graph showing a detected current value of the first current detection part and (d) is a graph showing a detected current value of the second current detection part.

When the insulation member 23 has deteriorated, as shown in FIG. 14(*c*) and FIG. 14(*d*), a large leak current $I_L$ flows after the burning mode is finished and a temperature of the heater part 22 reduces. At this time, it is possible for the control circuit part 4 to judge that the insulation member 23 has deteriorated when the leak current $I_L$ detected by the current detection part 3 and the leak current $I_L$ detected by the supplemental current detection part 3' are more than a predetermined current value Id after the burning mode is finished.

Next, a description will be given of the action of the control circuit part 4 in the particulate matter detection system according to the third exemplary embodiment with reference to the flow chart shown in FIG. 11.

Figure 11:
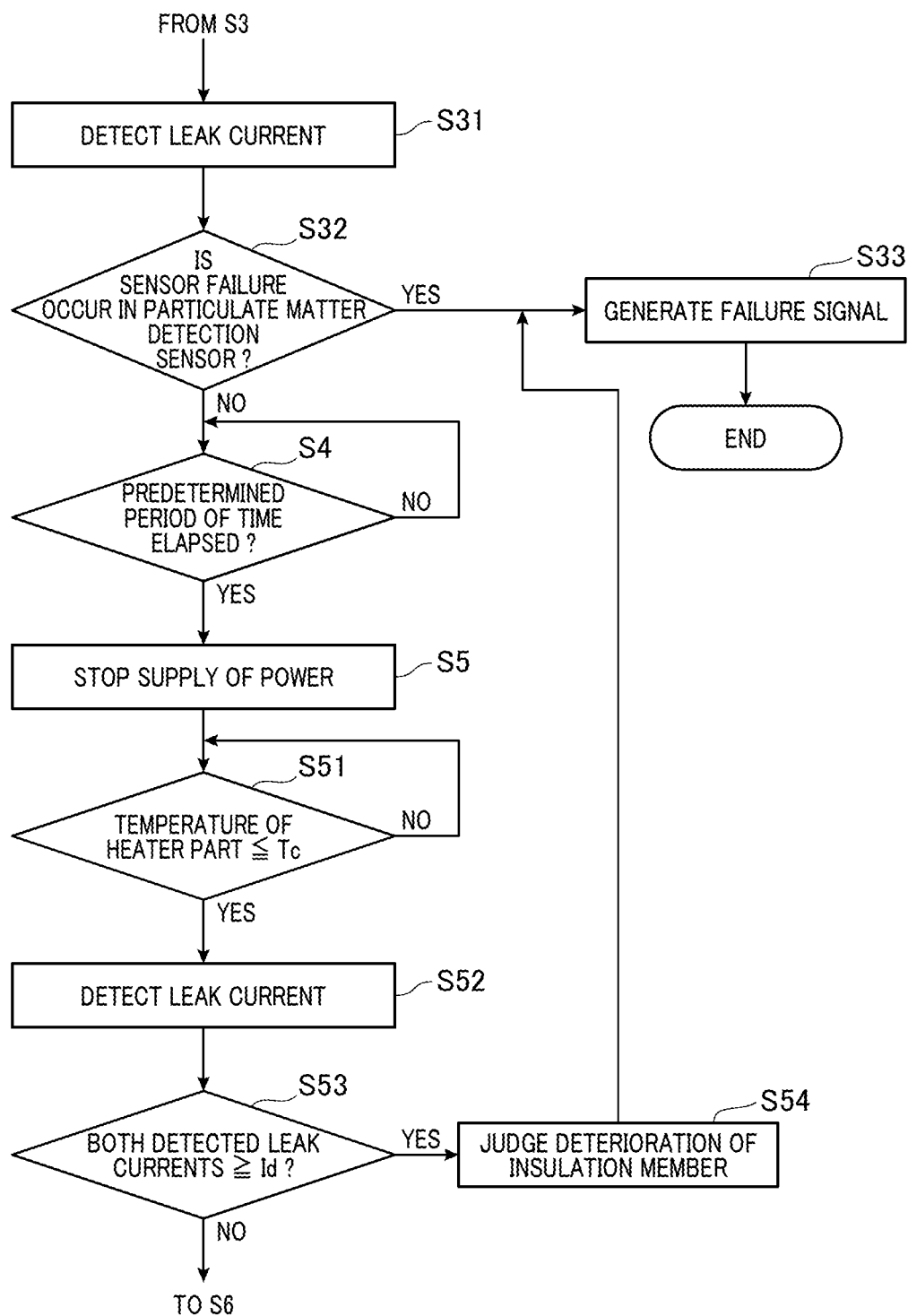
FIG. 11 is a flow chart showing a partial process performed by the particulate matter detection system according to a third exemplary embodiment of the present invention.

The flow chart shown in FIG. 11 shows the processes which follow step S3 shown in FIG. 4 in the explanation of the first exemplary embodiment.

In step S3, when the detection result indicates Yes, the operation flow progresses to step S32 shown in FIG. 11. In step S32, the control circuit part 4 instructs the current detection part 3 to detect the leak current $I_L$. After this, the operation flow progresses to step S32, the control circuit part 4 detects whether a sensor failure occurs in the particulate matter detection sensor 2. For example, when one of the leak current $I_L$ detected by the current detection part 3 and the leak current $I_L$ detected by the supplemental current detection part 3' is smaller than the predetermined judgment value Ic, the control circuit part 4 judges that a line disconnection of the wiring 24 has occurred.

Further, when both the leak current $I_L$ detected by the current detection part 3 and the leak current $I_L$ detected by the supplemental current detection part 3' are smaller than the predetermined judgment value Ic, the control circuit part 4 judges that the heater part 22 is in a heater failure. The operation flow progresses to step S33. In step S33, the control circuit part 4 generates a failure signal so as to instruct the user to replace the particulate matter detection sensor 2 with a new particulate matter detection sensor.

When the detection result indicates No in step S32, i.e. indicates that a sensor failure does not occur in the particulate matter detection sensor 2, the control circuit part 4 executes the processes in step S4 and S5. The operation flow progresses to step S51. In step S51, the control circuit part 4 detects whether a temperature of the heater part 22 is smaller than a predetermined value Tc (see FIG. 14(*a*)). When the detection result in step S51 indicates Yes, the operation flow progresses to step S52. In step S52, the current detection part 3 detects the leak current $I_L$ again. The operation flow progresses to step S53. In step S53, the control circuit part 4 judges whether both the leak current $I_L$ detected by the current detection part 3 and the leak current $I_L$ detected by the supplemental current detection part 3' are higher than the predetermined current value Id (see FIG. 14(*c*) and FIG. 14(*d*)). When the judgment result in step S53 indicates Yes, the operation flow progresses to step S54. In step S54, the control circuit part 4 determines that the insulation member 23 has deteriorated. After this step S53, the operation flow progresses to step S33. In step S33, the control circuit part 4 generates a failure signal.

On the other hand, when the judgment result in step S53 indicates No, the operation flow progresses to step S6 (see FIG. 4).

A description will be given of the action and effects of the particulate matter detection system according to the third exemplary embodiment. Even if a line disconnection occurs in the wiring 24, a heater failure occurs in the heater part 22, or the deterioration of the insulation member 23 occurs, the particulate matter detection system according to the third exemplary embodiment can detect a sensor failure of the particulate matter detection sensor 2 because the control circuit part 4 performs a failure process on the basis of the detected leak current $I_L$. Accordingly, it is possible for the particulate matter detection system according to the third exemplary embodiment to detect a sensor failure of the particulate matter detection sensor 2 with high accuracy.

In addition to the features previously described, the particulate matter detection system according to the third exemplary embodiment has the same structure, action and effects as the particulate matter detection system according to the first exemplary embodiment.

Fourth Exemplary Embodiment

A description will now be given of the particulate matter detection system according to a fourth exemplary embodiment with reference to FIG. 15 and FIG. 16.

The fourth exemplary embodiment provides a modification of the action of the control circuit part 4 in the particulate matter detection system according to the first exemplary embodiment. FIG. 15 shows the flow chart of the control circuit part in the particulate matter detection system according to the fourth exemplary embodiment. The flow chart shown in FIG. 15 according to the fourth exemplary embodiment shows the processes which follow step S8 shown in FIG. 5 according to the first exemplary embodiment.

Figure 15:
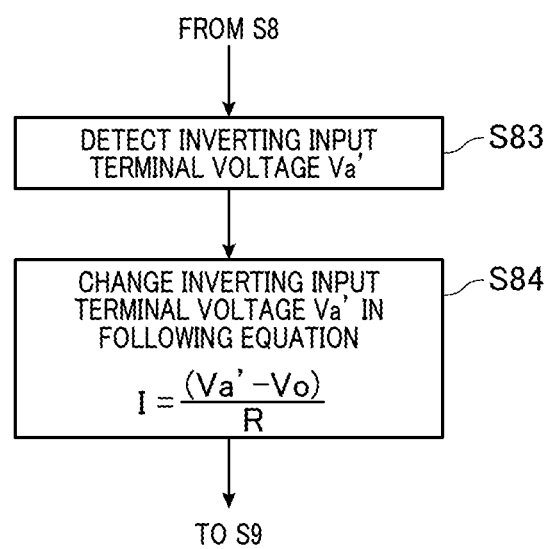
FIG. 15 is a flow chart showing a partial process performed by the particulate matter detection system according to a fourth exemplary embodiment of the present invention.

As shown in FIG. 15, after the process in step S8 is finished, the control circuit part 4 performs the process in step S83. In step S83, the control circuit part 4 detects an inverting input terminal voltage Va' of the operational amplifier OP (see FIG. 2). That is, when the control circuit part 4 performs the process in step S83, a temperature of the heater part 22 has been adequately reduced because the process in step S6 (see FIG. 4) has already been performed. Accordingly, the leak current $I_L$ does not flow because the insulation member 23 has deteriorated. Because the leak current $I_L$ does not flow in the resistance R of the current detection part 3, and no voltage drop occurs in the resistance R. For this reason, the operational amplifier OP supplies the output voltage Vo which is substantially equal to the inverting input terminal voltage Va'. It is accordingly for the control circuit part 4 to detect the inverting input terminal voltage Va' (=Vo) of the operational amplifier OP with high accuracy on the basis of the output voltage Vo detected by the voltage detection circuit 32.

The operation flow progresses to step S84 after step S83. In step S84, the control circuit part 4 adjusts the inverting input terminal voltage Va' in the equation (1). After step S84, the operation flow progresses to step S9 (see FIG. 5). In step S9, the control circuit part 4 continues the detection mode, and calculates the current I by using the equation (1).

A description will be given of the action and effects of the particulate matter detection system according to the fourth exemplary embodiment. Because the inverting input terminal voltage Va' of the operational amplifier OP does not strictly equal to the non-inverting input terminal voltage Va. That is, the inverting input terminal voltage Va' of the operational amplifier OP is different from the non-inverting input terminal voltage Va by the offset voltage ΔV. Further, the offset voltage ΔV varies due to an ambient temperature change, etc. For this reason, the inverting input terminal voltage Va' is not always a constant value, and varies due to the temperature change. In the fourth exemplary embodiment, the control circuit part 4 detects the inverting input terminal voltage Va' of the operational amplifier OP, and calculates the current I on the basis of the detected inverting input terminal voltage Va'. This makes it possible for the control circuit part 4 to calculate the current I with high accuracy.

In particular, in the fourth exemplary embodiment, the control circuit part 4 detects the inverting input terminal voltage Va' after the temperature of the heater part 22 has been adequately reduced. For this reason, it is possible to detect the inverting input terminal voltage Va' (=Vo) under the situation in which the leak current $I_L$ does not flow in the resistance. Still further, in the fourth exemplary embodiment, the first electrode 21a is connected to an inverting input terminal 39' of a supplemental operational amplifier OP' when the control circuit part 4 detects the inverting input terminal voltage Va'. A inverting input terminal voltage Vb' of the supplemental operational amplifier OP' is substantially equal to the inverting input terminal voltage Va' of the operational amplifier OP. Accordingly, even if a voltage difference between the pair of electrodes 21 substantially becomes zero, and particulate matter has remained on the accumulation part 20, the current I does not substantially flow between the electrodes 21.

In the particulate matter detection system according to the fourth exemplary embodiment, the control circuit part 4 detects the output voltage Vo, i.e. the inverting input terminal voltage Va' under the situation in which the current I does not substantially flow between the electrode s21 and the leak current $I_L$ does not flow. This makes it possible to detect the inverting input terminal voltage Va' with high accuracy without generating the voltage drop in the resistance R.

In addition to the features previously described, the particulate matter detection system according to the fourth exemplary embodiment has the same structure, action and effects as the particulate matter detection system according to the first exemplary embodiment.

Fifth Exemplary Embodiment

A description will now be given of the particulate matter detection system according to a fifth exemplary embodiment with reference to FIG. 16.

The fifth exemplary embodiment provides a modification of the connection between the first electrode 21a and the supplemental current detection part 3'.

Figure 16:
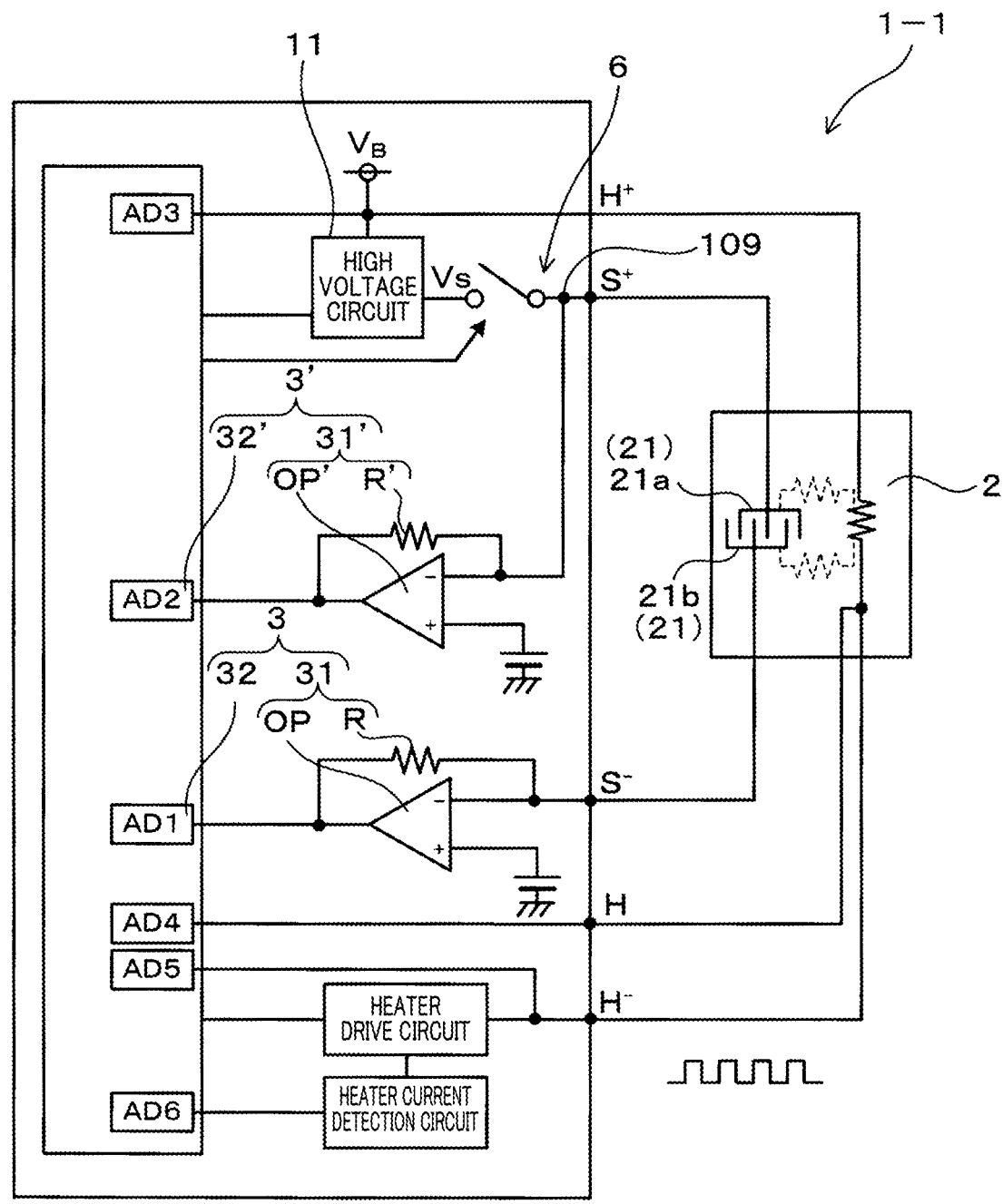
FIG. 16 is a view showing a circuit diagram of a particulate matter detection system in the burning mode according to a fifth exemplary embodiment of the present invention.

As shown in FIG. 16, in the fifth exemplary embodiment, the first electrode 21a is always connected to the supplemental current detection part 3'. Further, the switch 6 is arranged between the high voltage circuit 11 and a connection node between the first electrode 21a and the supplemental current detection part 3'. In the sixth exemplary embodiment, the switch 6 is turned off in the burning mode. In the detection mode, the switch 6 is turned ON so as to connect the first electrode 21a to the high voltage circuit 11. This makes it possible to supply the voltage Vs of the high voltage circuit 11 between the pair of the first electrode 21a and the second electrode 21b. Particulate matter contained in exhaust gas is captured on the accumulation part 20, i.e. between the pair of the first electrode 21a and the second electrode 21b.

In addition to the features previously described, the particulate matter detection system according to the fifth exemplary embodiment has the same structure, action and effects as the particulate matter detection system according to the first exemplary embodiment.

Sixth Exemplary Embodiment

A description will now be given of the particulate matter detection system 1-1 according to a sixth exemplary embodiment with reference to FIG. 17 to FIG. 28.

Figure 17:
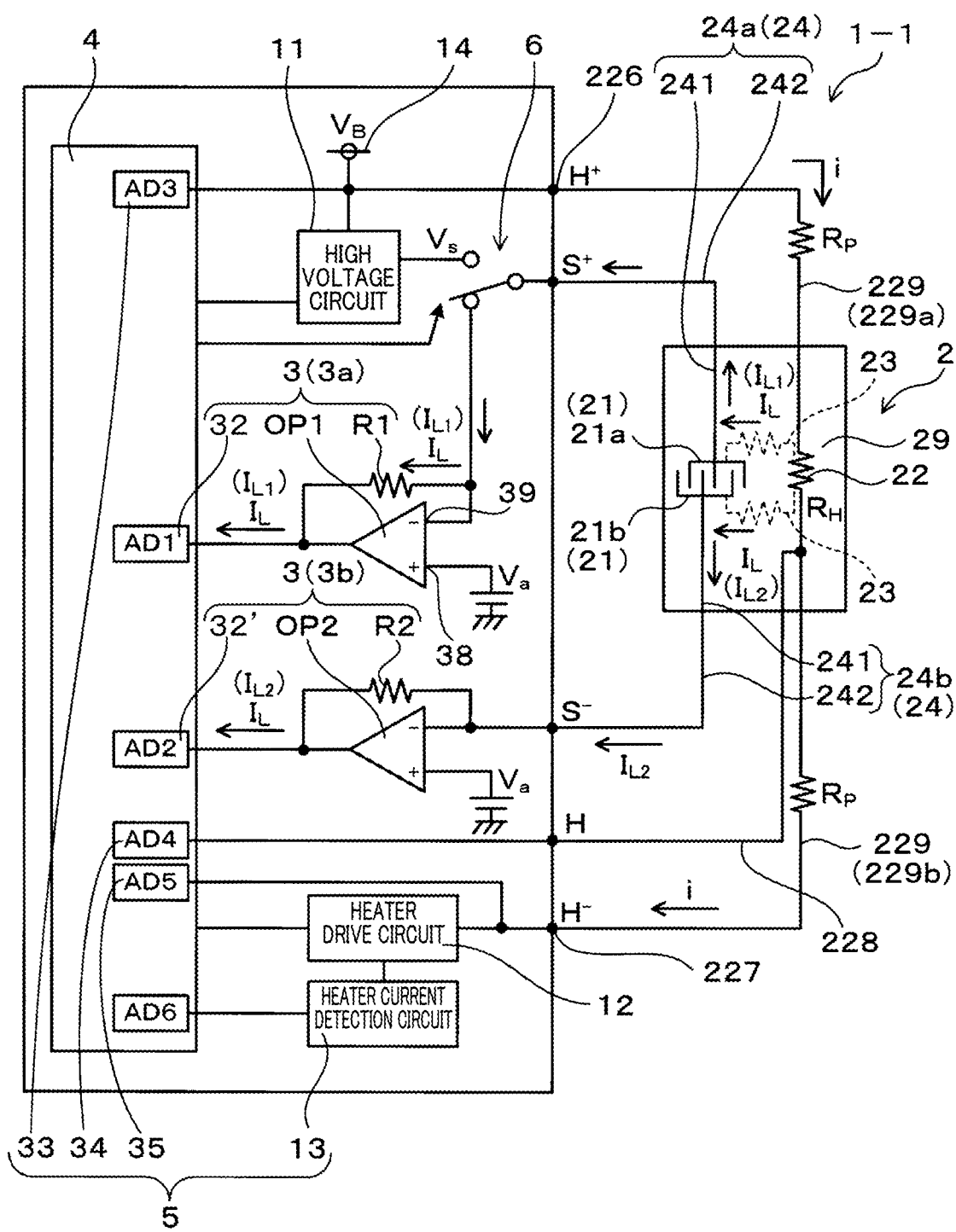
FIG. 17 is a view showing a circuit diagram of a particulate matter detection system in the burning mode according to a sixth exemplary embodiment of the present invention.

As shown in FIG. 17, the particulate matter detection system 1-1 according to the sixth exemplary embodiment has the particulate matter detection sensor 2, a pair of current detection parts 3 (3a, 3b), and the control circuit part 4.

Figure 19:
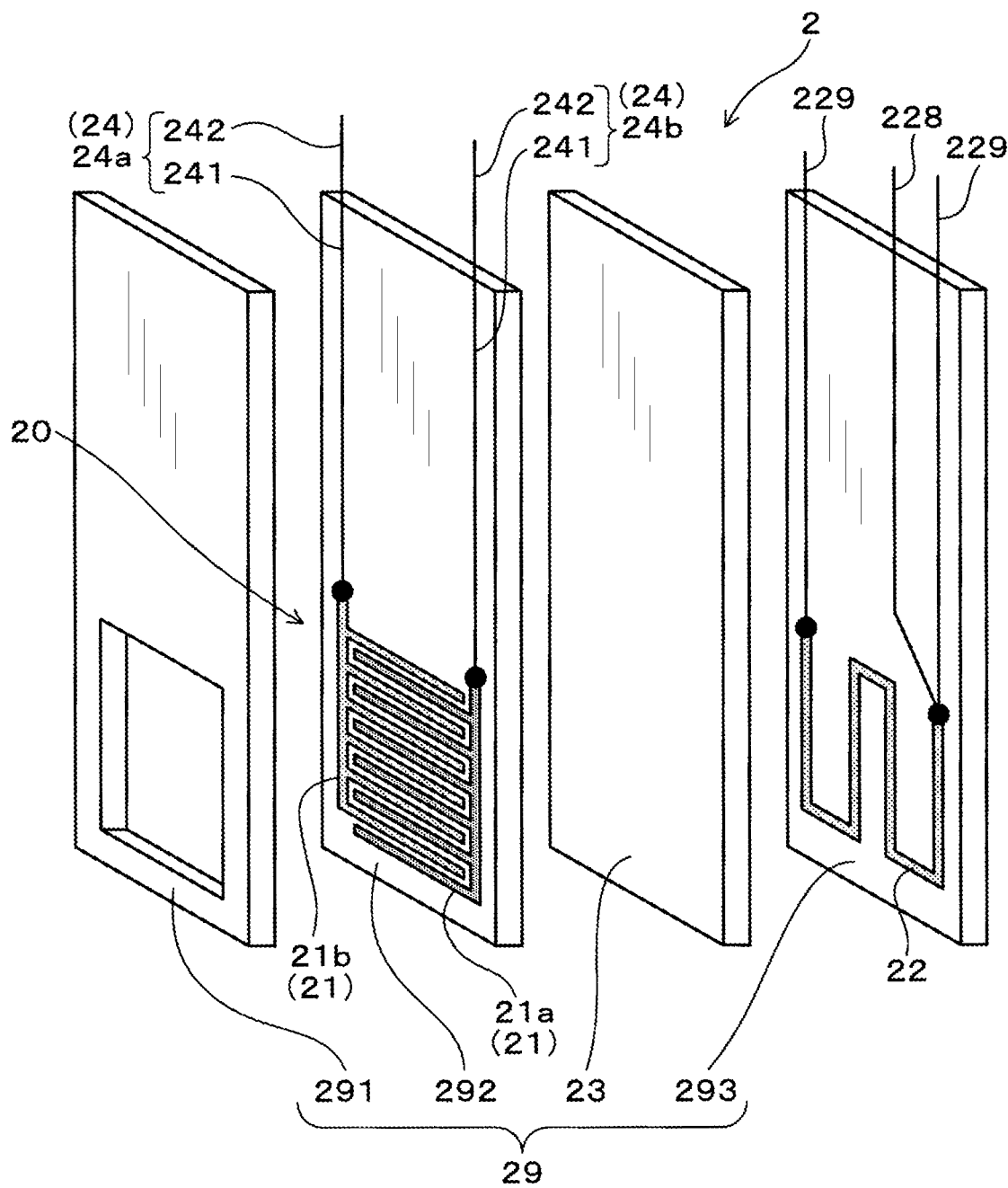
FIG. 19 is a perspective exploded view showing the particulate matter detection sensor in the particulate matter detection system according to the sixth exemplary embodiment of the present invention.

As shown in FIG. 19, the particulate matter detection sensor 2 has the accumulation part 20, the pair of electrodes 21 (21a, 21b), the heater part 22 and the insulation member 23. Particulate matter contained in exhaust gas is accumulated on the accumulation part 20. The pair of electrodes 21 are formed on the accumulation part 20 so that the pair of electrodes 21 are separated from each other. The electrode 21 has the first electrode 21a and the second electrode 21b. The heater part 22 generates heat energy to heat the accumulation part 20. The insulation member 23 is arranged between the electrodes 21 and the heater part 22.

As shown in FIG. 17, the current detection part 3 is composed of a first current detection part 3a and a second current detection part 3b. The pair of the first current detection part 3a and the second current detection part 3b are electrically connected to the first electrode 21a and the second electrode 21b, respectively. That is, the first current detection part 3a is electrically connected to the first electrode 21a, and the second current detection part 3b is electrically connected to the second electrode 21b.

The control circuit part 4 is connected to the particulate matter detection sensor 2, the first current detection part 3a and the second current detection part 3b. When the heater part 22 generates heat energy, the control circuit part 4 is configured to detect the leak current $I_L$, which is flowing from the heater part 22 to the electrodes 21 (21a, 21b) through the insulation member 23, by using the pair of the first current detection part 3a and the second current detection part 3b, and configured to judge whether a sensor failure occurs in the particulate matter detection sensor 2 on the basis of the detected leak current $I_L$.

The particulate matter detection system 1-1 according to the sixth exemplary embodiment is mounted on a diesel vehicle. The control circuit part 4 is composed of a microcomputer system. The control circuit part 4 has a plurality of A/D converters.

The control circuit part 4 is configured to switch between the detection mode (see FIG. 18) and a heating mode (see FIG. 17). In the detection mode, the control circuit part 4 detects an amount of particulate matter contained in exhaust gas. In the heating mode, the particulate matter accumulated on the accumulation part 20 is burned so as to remove the particulate matter from the accumulation part 20.

Figure 18:
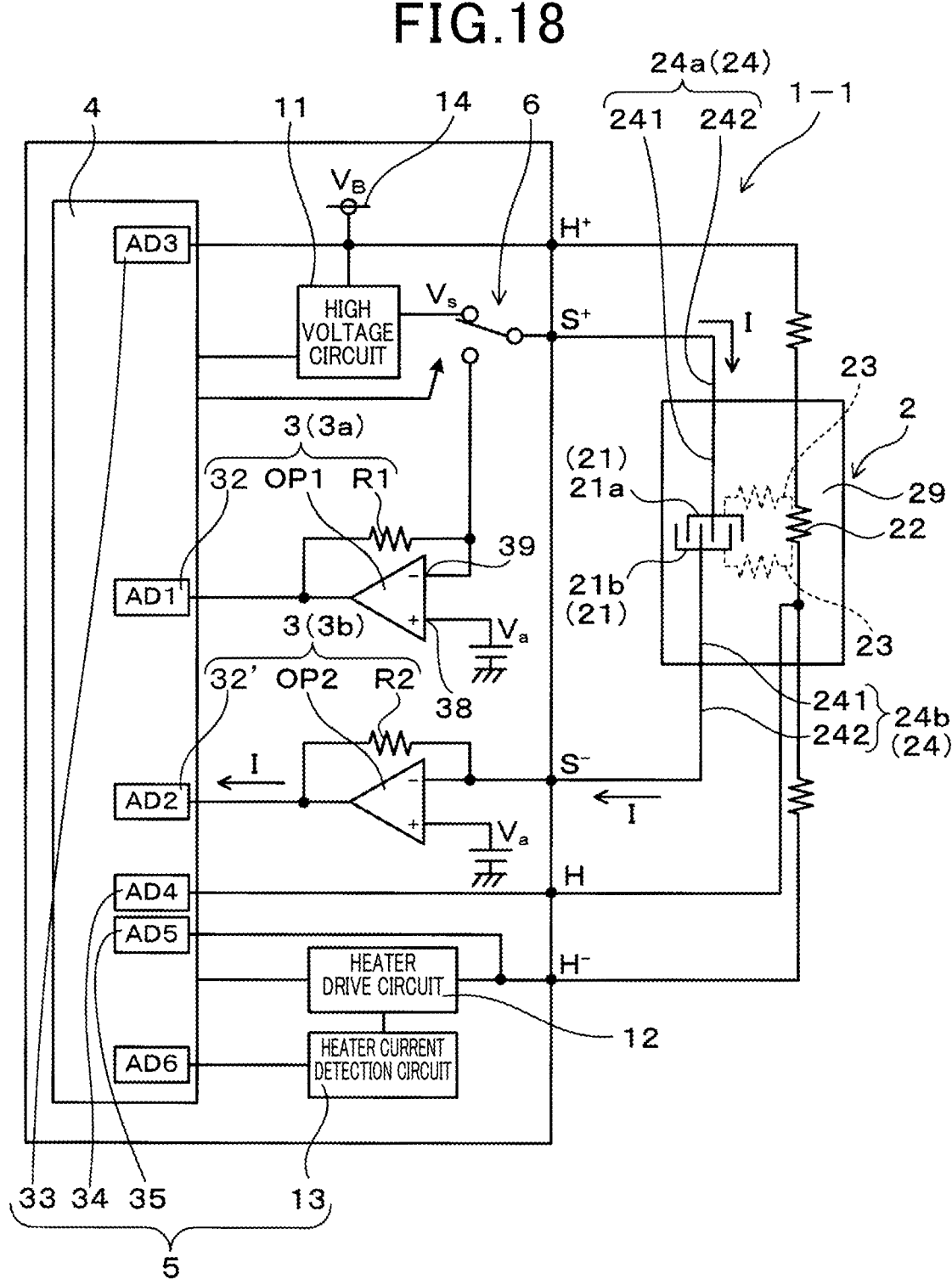
FIG. 18 is a view showing a circuit diagram of a particulate matter detection system in the detection mode according to the sixth exemplary embodiment of the present invention.

As shown in FIG. 18, the control circuit part 4 supplies a voltage Vs between the pair of the first electrode 21a and the second electrode 21b in the detection mode. This generates electromagnetic field between the pair of the first electrode 21a and the second electrode 21b. A detected current I flows between the pair of the first electrode 21a and the second electrode 21b when particulate matter is accumulated on the accumulation part 20. The second current detection part 3b detects the detected current I, and the control circuit part 4 detects an amount of particulate matter contained in exhaust gas on the basis of the detected current I.

Figure 28:
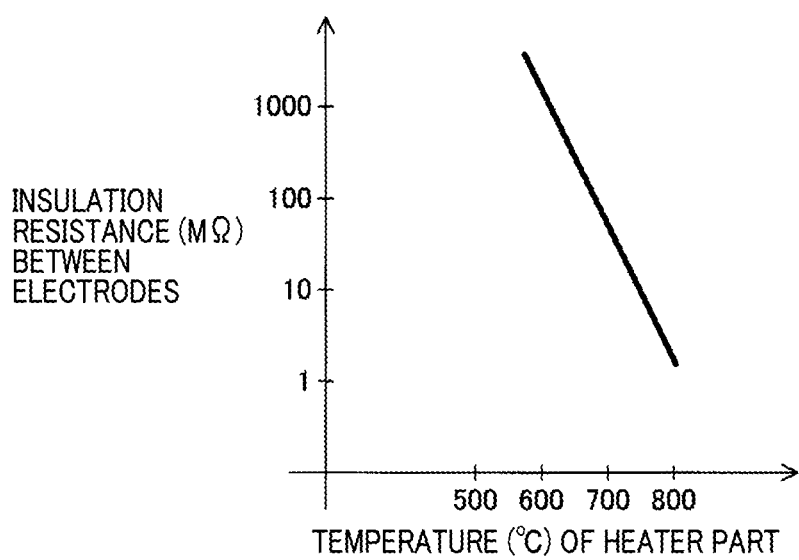
FIG. 28 is a view showing a relationship between a temperature of the heater part and an electrical resistance of the insulation member in the particulate matter detection system according to a seventh exemplary embodiment of the present invention.

When a large amount of particulate matter is accumulated on the accumulation part 20, the detected current I is saturated. In this case, as shown in FIG. 17, the control circuit part 4 switches to the heating mode from the detection mode, and instructs the heater part 22 to generate heat energy in order to burn particulate matter accumulated on the accumulation part 20. That is, the insulation member 23 (see FIG. 19) in the particulate matter detection sensor 2 is heated by the generated heat energy. As shown in FIG. 28, there is a constant relationship between an electrical resistance and a temperature of the insulation member 28. That is, when a temperature of the insulation member 23 increases by the heat energy generated by the heater part 23, a temperature of the insulation member 23 also increases, and the electrical resistance of the insulation member 23 is reduced. As shown in FIG. 17, the leak current $I_L$ flows between the heater part 22 and the electrodes 21 821a, 21b). The pair of the current detection parts 3a and 3b detect the leak current $I_L$, respectively.

In addition, the particulate matter detection system 1-1 according to the sixth exemplary embodiment is equipped with the high voltage circuit 11, the switch 6, the operational amplifiers OP1 and OP2, the two resistances R1 and R2, the heater drive circuit 12 and the heater current detection circuit 13. The first operational amplifier OP1, the first resistance R1, the first A/D converter (AD1) 32 from the first current detection part 3a. The second operational amplifier OP2, the second resistance R2, the second A/D converter (AD2) 32' from the second current detection part 3b.

As shown in FIG. 17, the non-inverting input terminal 38 of the first operational amplifier OP1 is maintained at the constant voltage Va. The inverting input terminal 39 is also maintained at the voltage Va by a virtual short circuit as characteristics of the operational amplifier. Because the leak current II flows in the first resistance R1, the output voltage Vo of the first operational amplifier OP1 is smaller than the voltage Va of the inverting input terminal 39 by $I_L \times R1$. Accordingly, the equation of $Vo = Va - I_L \times R1$ is satisfied. The first A/D converter (AD1) 32 detects this output voltage Vo in order to detect the leak current $I_L$. This leak current $I_L$ can be expressed by the following equation.

$$I_L = (Va - Vo)/R1.$$

The second current detection part 3b also detects the leak current $I_L$ on the basis of the same manner previously described. Still further, in the detection mode (se FIG. 18), the second current detection part 3b detects the current I on the basis of the same manner previously described.

On the other hand, the particulate matter detection sensor 2 has the two wirings 24, i.e. the first wiring 24a and the second wiring 24b. The first wiring 24a is connected to the first electrode 21a, and the second wiring 24b is connected to the second electrode 21b. The first current detection part 3a is electrically connected to the first electrode 21a through the first wiring 24a and the switch 6. The second current detection part 3b is electrically connected to the second electrode 21b through the second wiring 24b.

The wirings 24 (24a, 24b) are composed of a first wiring component 241 and a second wiring component 242 which is connected to the first wiring component 241. The second wiring component 242 acts as a current path through which the first wiring component 241 is connected to the current detection part 3.

Figure 20:
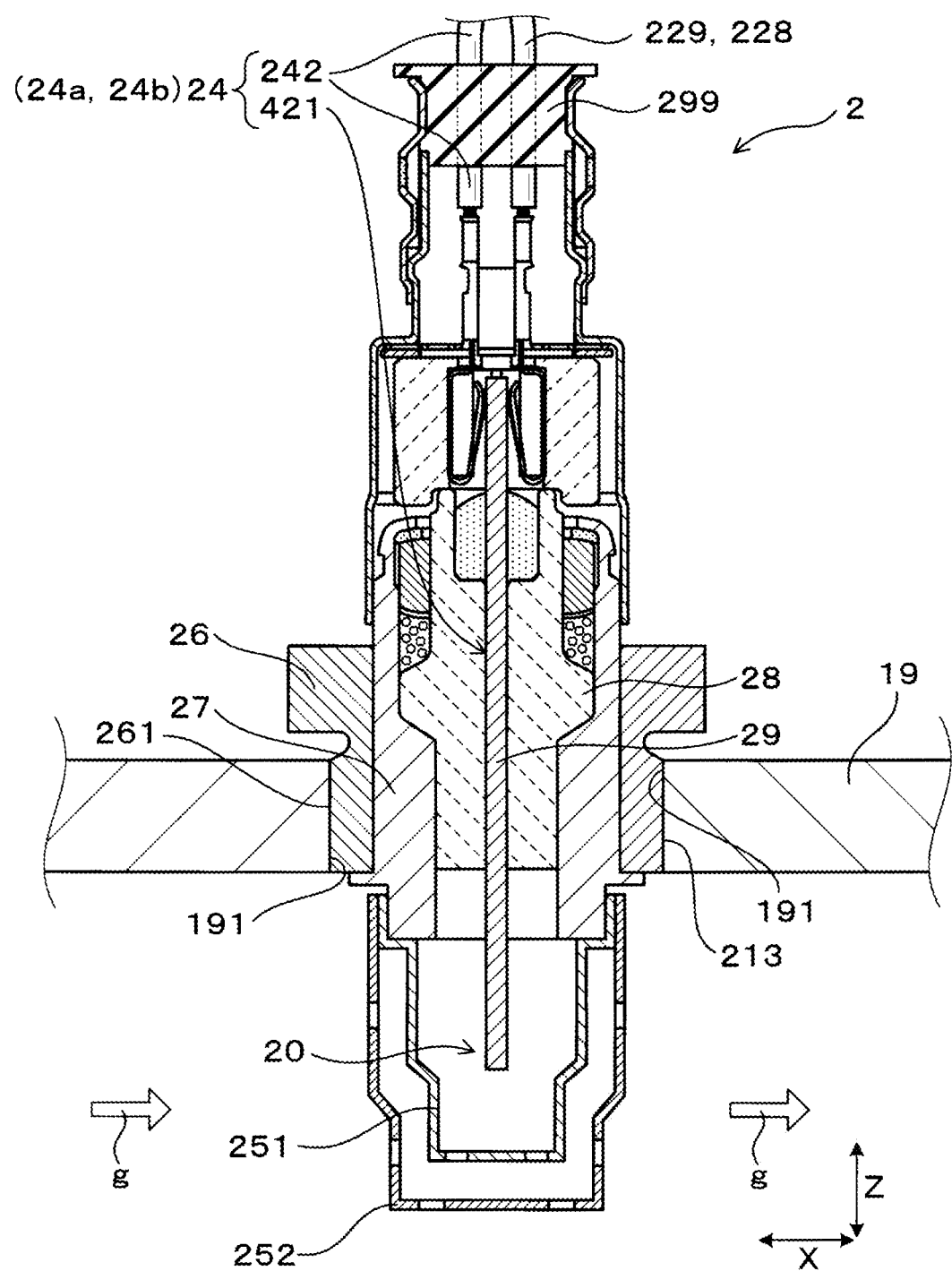
FIG. 20 is a view showing a cross section of the particulate matter detection sensor in the particulate matter detection system according to the sixth exemplary embodiment of the present invention.

As shown in FIG. 20, the particulate matter detection sensor 2 has an insulation base 29 made of ceramic, etc., a supporting part 28 which supports the insulation base 29, a housing 27 and a fastening part 26. As shown in FIG. 19, the insulation base 29 has a cover part 291, an electrode substrate 292, an insulation member 23, and a heater substrate 293. The pair of the first electrodes 21a and the second electrode 21b are formed on the electrode substrate 292.

The first wiring part 241 of the wirings 24 (24a, 24b) is formed on the electrode substrate 292. The electrode substrate 292 is covered with the cover part 291 so that the accumulation part 20 is exposed outside. The heater part 22 is formed on the heater substrate 293. The insulation member 23 is arranged between the heater substrate 293 and the electrode substrate 292.

As shown in FIG. 20, the housing 27 is arranged in the fastening part 26. The housing 27 accommodates the supporting part 28 and the insulation substrate 29. A male screw part 261 in the fastening part 26 is screwed into a female screw part 191 of a discharging pipe 19 so as to fix the particulate matter detection sensor 2 to the discharging pipe 19. The accumulation part 20 is covered with covers 251 and 252.

As previously described, the first wiring part 241 of the wirings 24a and 24b is formed in the insulation substrate 29. The first wiring part 241 is connected to the second wiring part 242. The second wiring part 242 is inserted into a sealing rubber 299 of the particulate matter detection sensor 2. The first wiring part 241 and the second wiring part 242 form the wirings 24 (24a, 24b).

On the other hand, in the detection mode, as shown in FIG. 18, the control circuit part 4 instructs the switch 6 to connect the first electrode 21a to the high voltage circuit 11. Further, in the heating mode shown in FIG. 17, the control circuit part 4 instructs the switch 6 to connect the first electrode 21a to the first current detection part 3a.

The heater part 22 in the particulate matter detection sensor 2 is connected to the battery terminal 14 and the heater drive circuit 12. The battery terminal 14 has a voltage within a range of 10V to 16V. The high voltage circuit 11 boosts the voltage of the battery terminal 14 to a high voltage within a range of 30V to 50V.

Figure 27:
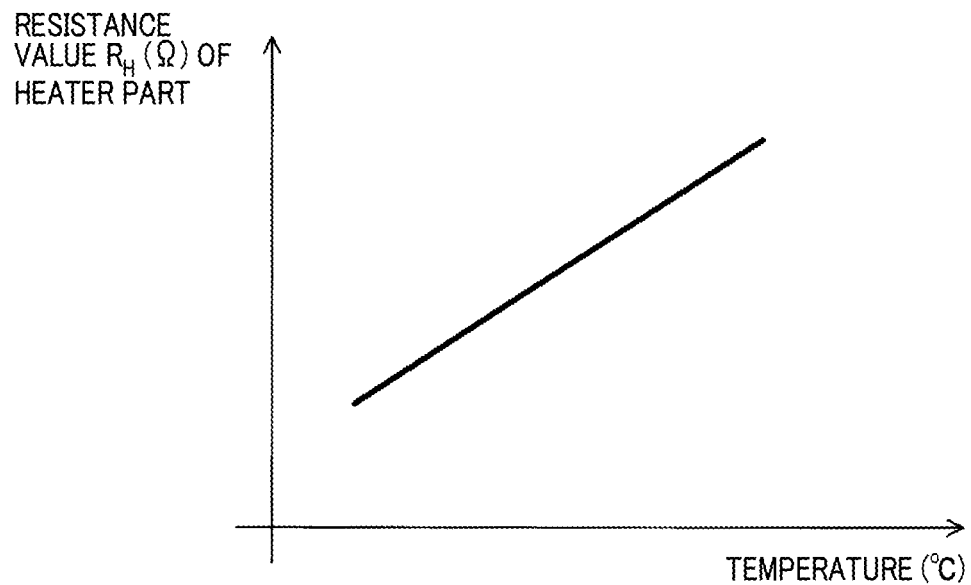
FIG. 27 is a view showing a relationship between an electrical resistance and a temperature of the heater part in the particulate matter detection system according to the sixth exemplary embodiment.

As shown in FIG. 17, the particulate matter detection system 1 according to the sixth exemplary embodiment is equipped with the temperature detection part 5 capable of detecting a temperature of the heater part 22. The temperature detection part 5 is composed of three A/D converters (AD3, AD4, AD5) 33 to 35 and a heater current detection circuit 13. The temperature detection part 5 detects a heater resistance $R_H$ which is an electrical resistance of the heater part 22, and calculates a temperature of the heater part 22 on the basis of the detected heater resistance $R_H$. As shown in FIG. 27, there is a constant relationship between the temperature and the heater resistance $R_H$ of the heater part 22. Accordingly, the temperature detection part 5 calculates a temperature of the heater part 22 on the basis of the detected heater resistance $R_H$.

A description will be given of the method of detecting a temperature of the heater part 22 in more detail. As shown in FIG. 17, the heater wirings 229a, 229b have the parasitic wiring resistance Rp.

Because the two heater wirings 229a and 229b have the same length, each of the two heater wirings 229a and 229b has the same parasitic wiring resistance Rp. In the sixth exemplary embodiment, the control circuit part 4 obtains the voltage $V_H$ between the two terminals 226 and 227, to which the heater wiring 229 is connected, by using the third A/D converter 33 and the fifth A/D converter 35. Further, the control circuit part 4 obtains the current i which flows in the heater part 22 by using the heater current detection circuit 13.

The control circuit part 4 calculates the total resistance Ra which is a sum of the heater resistance $R_H$ and the two wiring resistances Rp on the basis of the obtained voltage $V_H$ and the obtained current i. The total resistance Ra can be expressed by the equation (4).

$$Ra = V_H/i = R_H + 2Rp \qquad (4).$$

In the sixth exemplary embodiment, the control circuit part 4 obtains the voltage Vp which is supplied to the heater wiring 229b by using the fourth A/D converter 34 and the fifth A/D converter 35. It is possible for the control circuit part 4 to calculate the parasitic wiring resistance Rp of the heater wiring 229b by using the following equation (5) and using the detected voltage Vp and the detected current i.

$$Rp=Vp/i \tag{5}$$

The fourth A/D converter 34 is connected to the sensing wiring 228. The sensing wiring 228 is connected to a node close to the heater part 22. It is possible to detect the voltage Vp supplied to the heater wiring 229b through the sensing wiring 228 by using the fourth A/D converter 34. Although the sensing wiring 228 has a parasitic resistance, a current does not flow in the sensing wiring 228. Accordingly, no voltage drop occurs in the sensing wiring 228, and this makes it possible to detect the voltage Vp with high accuracy.

In the sixth exemplary embodiment, the temperature detection part 5 detects the total resistance Ra and the parasitic wiring resistance Rp by using the equations (1) and (2) previously described, and calculates the heater resistance $R_H$ by using the following equation. That is, the temperature detection part 5 subtracts the two parasitic wiring resistances Rp from the total resistance Ra. This makes it possible for the temperature detection part 5 to obtain the correct heater resistance $R_H$ without the influence of the parasitic wiring resistance Rp, and to calculate a correct temperature of the heater part 22, where $R_H$=Ra−2 Rp.

Figure 21:
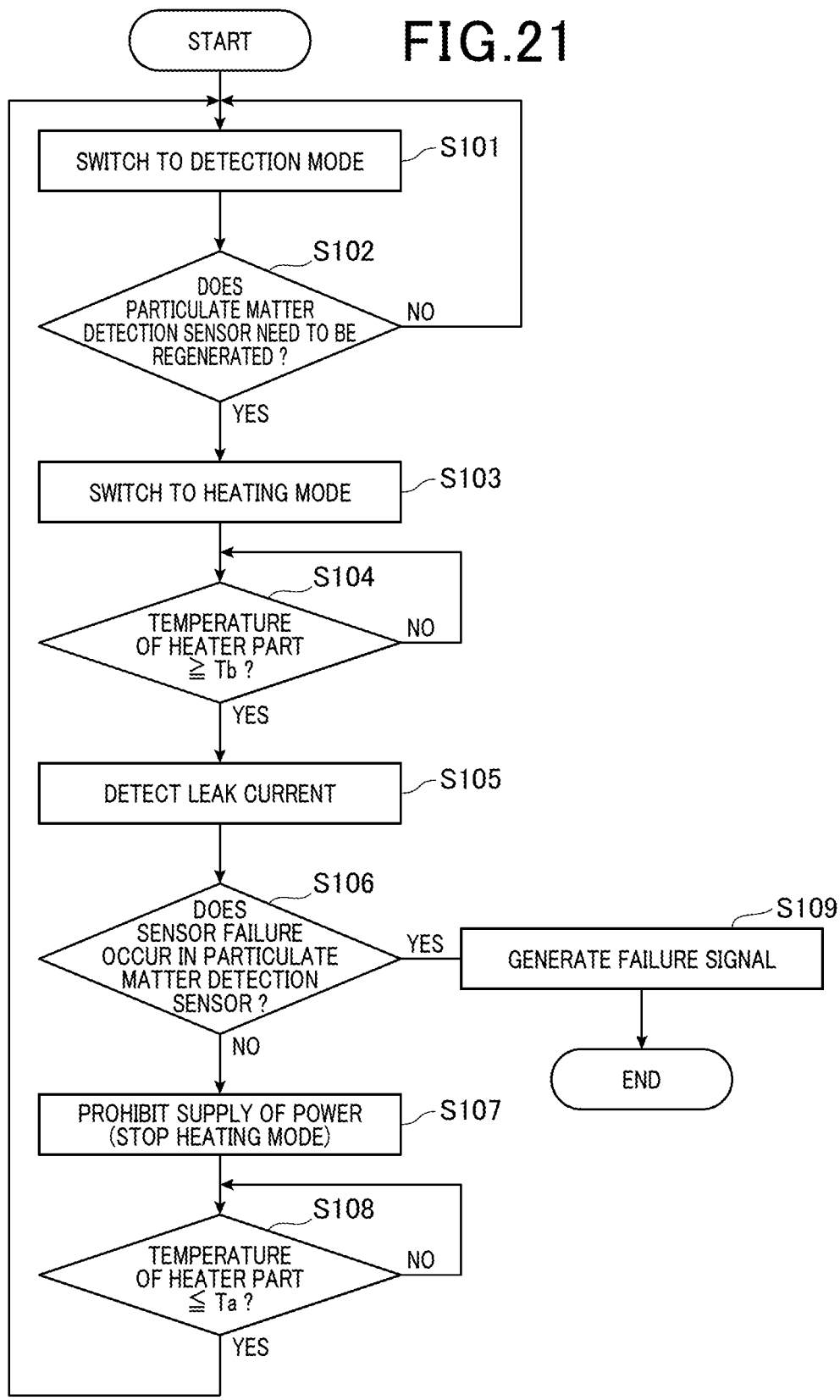
FIG. 21 is a flow chart showing processes of the particulate matter detection system according to the sixth exemplary embodiment of the present invention.

Next, a description will be given of the action of the control circuit part 4 with reference to the flow chart shown in FIG. 21. As shown in FIG. 21, the control circuit part 4 performs the process in step S101. In step S101, the control circuit part 4 enters the particulate matter detection system 1 into the detection mode (see FIG. 18). That is, the control circuit part 4 prohibits supply of power to the heater part 22, and instructs the high voltage circuit 11 to supply the voltage Vs to the pair of the first electrode 21a and the second electrode 21b. This control allows the collection part 20 to collect particulate matter contained in exhaust gas. The control circuit part 4 detects an amount of particulate matter contained in exhaust gas.

After the process in step S101 is finished, the operation flow progresses to step S102. In step S102, the control circuit part 4 judges whether to regenerate the particulate matter detection sensor 2. That is, the control circuit part 4 determines whether to instruct the heater part 22 to generate heat energy, and to burn the particulate matter accumulated on the accumulation part 20 by using the heat energy generated by the heater part 22. For example, the control circuit part 4 judges whether to regenerate the particulate matter detection sensor 2 on the basis of the current I detected by the second current detection part 3b (see FIG. 18). It is also acceptable for the control circuit part 4 to forcedly burn the particulate matter accumulated on the accumulation part 20 after a predetermined period of time has elapsed.

When the judgment result in step S101 indicates Yes, the operation flow progresses to step S103. In step S103, the control circuit part 4 switches to the heating mode (see FIG. 17). That is, the control circuit part 4 instructs the heater part 22 to generate heat energy. The operation flow progresses to step S104. In step S014, the control circuit part 4 detects whether a temperature of the heater part 22 has adequately increased. For example, the temperature detection part 5 detects a temperature of the heater part 22, and the control circuit part 4 detects whether the detected temperature of the heater part 22 is higher than the predetermined temperature Tb.

When the judgment result in step S104 indicates Yes, the operation flow progresses to step S105. In step S105, the control circuit part 4 obtains the leak current $I_L$ by using the pair of the first and second current detection parts 3a and 3b. That is, the first current detection part 3a detects a first leak current ILL (see FIG. 17) which flows from the heater part 22 to the first electrode 21a through the insulation member 23, and the second current detection part 3b detects a second leak current $I_{L2}$ (see FIG. 17) which flows from the heater part 22 to the second electrode 21b through the insulation member 23, After the process in step S105 is finished, the operation flow progresses to step S106. In step S106, the control circuit part 4 judges whether a sensor failure occurs in the particulate matter detection sensor 2 on the basis of the detected leak current $I_L$. For example, when the detected leak current $I_L$ is less than the predetermined lower limit value Ia (see FIG. 23(c), FIG. 24(c)), the control circuit part 4 judges that a line disconnection occurs in the wiring 24. That is, the control circuit part 4 determines that a line disconnection occurs in at least one of the first wiring part 241 and the second wiring part 242 (see FIG. 19), which form the wiring 24 (24a, 24b).

On the other hand, when the detected leak current $I_L$ is more than a predetermined upper limit value Ibu (see FIG. 26(c), (d)), the control circuit part 4 judges that at least one of deterioration of the insulation member 23 and a sensor failure of the heater part 22 has occurred.

When the detection result in step S106 indicates Yes, i.e. indicates that a sensor failure occurs in the particulate matter detection sensor 2, the operation flow progresses to step S109. In step S109, the control circuit part 4 generates a failure signal so as to promote the user to replace the particulate matter detection sensor 2 with a new particulate matter detection sensor. It is acceptable for the control circuit part 4 to inform the occurrence of a sensor failure of the particulate matter detection sensor 2 to the user. However, it is preferable to provide detailed information to specify a failure part in the particulate matter detection sensor 2. For example, it is preferable for the control circuit part 4 to provide warning information a line disconnection occurs in which wiring, a line disconnection occurs in the heater part 22, or a failure component, etc.

When the detection result in step S106 indicates No, i.e. indicates that a sensor failure has not occurred in the particulate matter detection sensor 2, the operation flow progresses to step S107. In step S107, the control circuit part 4 prohibits supply of power to the heater part 22. After step S107, the operation flow progresses to step S108. In step S108, the control circuit part 4 detects whether a temperature of the heater part 22 has been already reduced. That is, the control circuit part 4 detects whether a temperature of the heater part 22 is smaller than the predetermined temperature Tb (see FIG. 22(a)). When the detection result in step S108 indicates Yes, the operation flow progresses to step S101. In step S01, the control circuit part 4 starts the detection mode again.

A description will be given of the graphs, with reference to FIG. 22 to FIG. 26, which represent a relationship between a temperature of the heater part 22, a voltage between the first electrode 21a and the second electrode 21b, a detected value of the first current detection part 3a, a detected value of the second current detection part 3b and an elapsed time.

Figure 22:
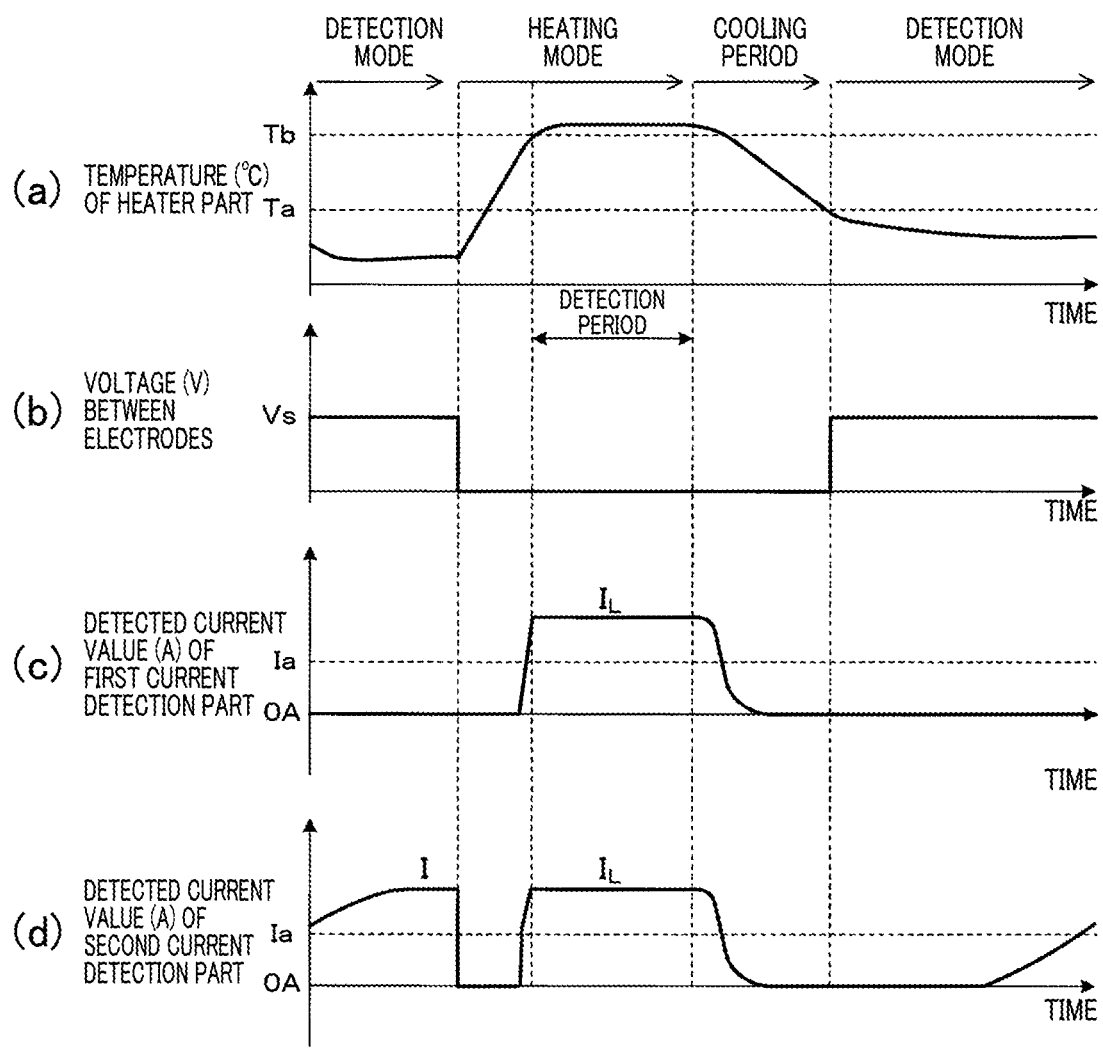
FIG. 22 is a diagram showing various graphs when the particulate matter detection sensor is correctly working in the particulate matter detection system according to the sixth exemplary embodiment, (a) is a graph showing a temperature of the heater part, (b) is a graph showing a voltage between the pair of electrodes, (c) is a graph showing a detected current value of the first current detection part and (d) is a graph showing a detected current value of the second current detection part.

FIG. 22 shows a graph when a sensor failure does not occur in the particulate matter detection sensor 2. As shown in FIG. 22, in the detection mode, the heater part 22 has a reduced temperature, and the voltage Vs of the high voltage circuit 11 (see FIG. 18) is supplied between the first electrode 21a and the second electrode 21b. In this case, because the first current detection part 3a is not connected to the first electrode 21a, the first current detection part 3a does not detect any current. The second current detection part 3b detects a current I which is flowing between the pair of the first electrode 21a and the second electrode 21b. In this case, the more an amount of particulate matter accumulated in the particulate matter detection sensor 2 increases, the higher the detected current I is gradually.

Figure 23:
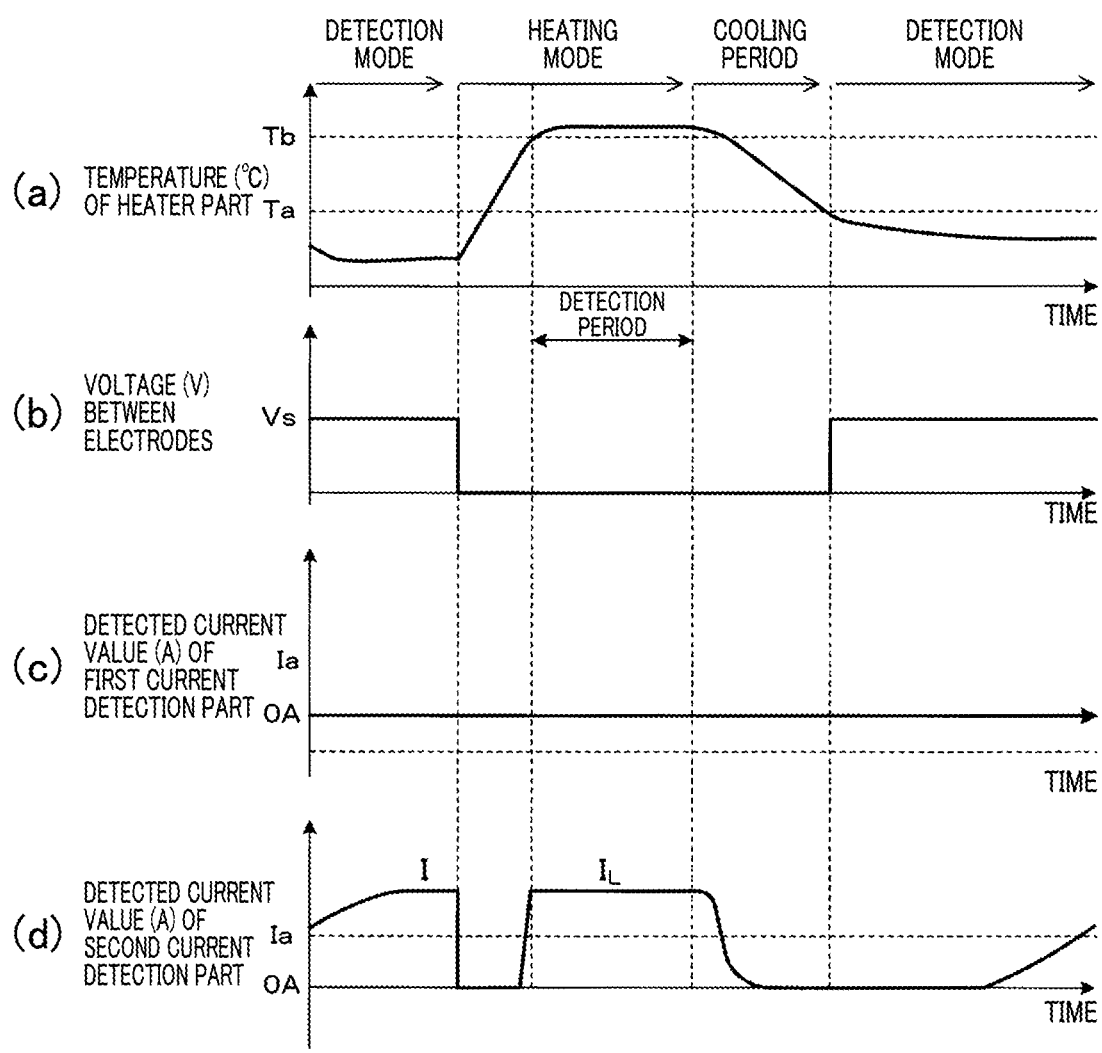
FIG. 23 is a diagram showing various graphs when a line disconnection occurs in the first wiring in the particulate matter detection system according to the sixth exemplary embodiment, (a) is a graph showing a temperature of the heater part, (b) is a graph showing a voltage between the pair of electrodes, (c) is a graph showing a detected current value of the first current detection part and (d) is a graph showing a detected current value of the second current detection part.

After the detection mode is finished, as previously described, the control circuit part 4 switches to the heating mode from the detection mode. Because the electric power is supplied to the heater part 22d in the heating mode, a temperature of the heater part 22 gradually increases, and a resistance value of the insulation member 23 (see FIG. 17 and FIG. 19) is gradually reduced. Accordingly, when a line disconnection occurs in the wiring 24, the pair of the first current detection part 3a and the second current detection part 3b detect a relatively large leak current $I_L$, respectively On the other hand, when a line disconnection occurs in the first wiring 24a, as shown in FIG. 23, it is difficult for the first current detection part 3a to detect the leak current $I_L$ (see FIG. 23(c)) even if a temperature of the heater part 22 becomes adequately high (see FIG. 23(a)). The control circuit part 4 judges that a line disconnection occurs in the first wiring 24a (see FIG. 17) when the leak current $I_L$ detected by the first current detection part 3a is less than the lower limit value Ia.

Figure 24:
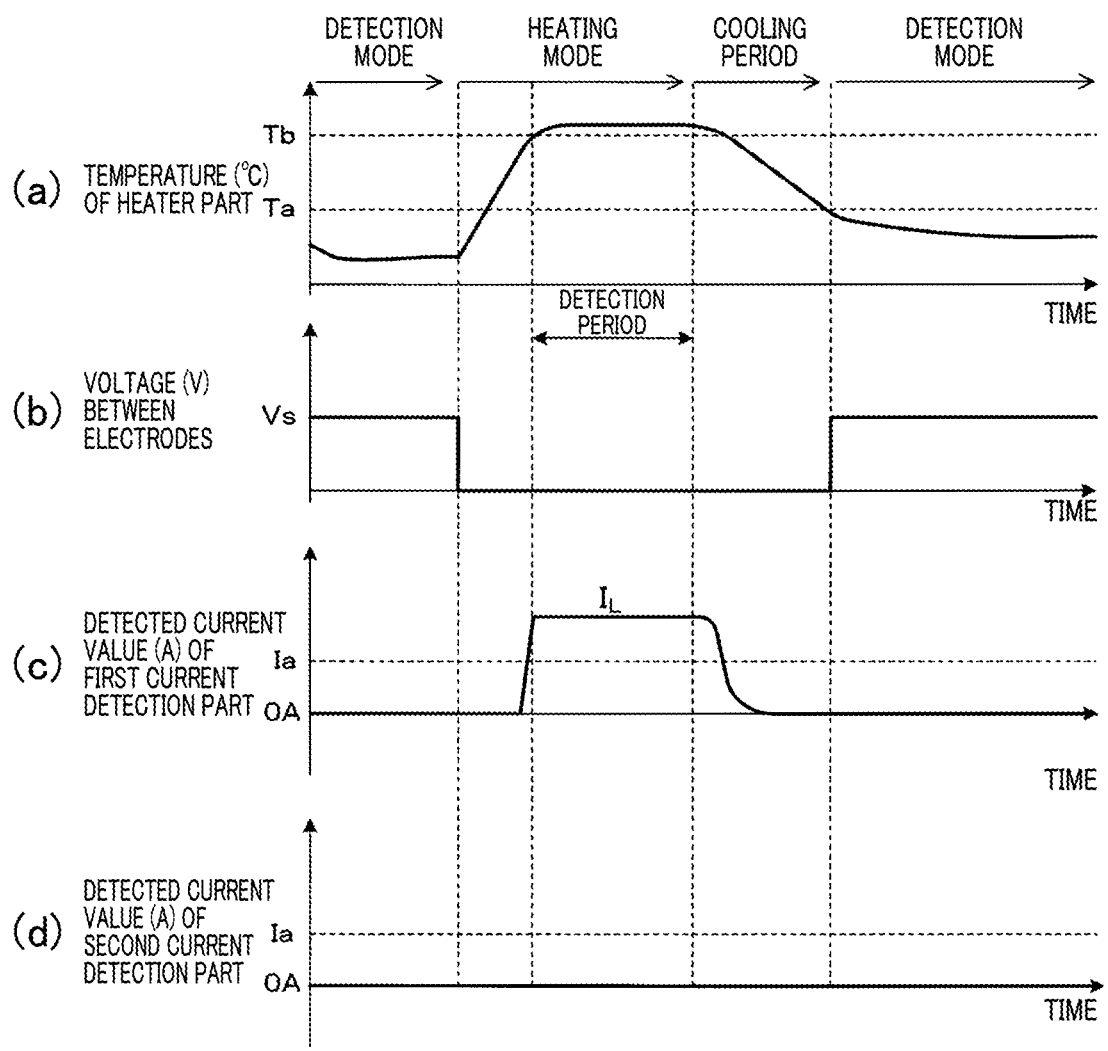
FIG. 24 is a diagram showing various graphs when a line disconnection occurs in the second wiring in the particulate matter detection system according to the sixth exemplary embodiment, (a) is a graph showing a temperature of the heater part, (b) is a graph showing a voltage between the pair of electrodes, (c) is a graph showing a detected current value of the first current detection part and (d) is a graph showing a detected current value of the second current detection part.

Similarly, when a line disconnection occurs in the second wiring 24b, as shown in FIG. 24, it is difficult for the second current detection part 3b to detect the leak current $I_L$ (see FIG. 24(d)) even if a temperature of the heater part 22 becomes adequately high (see FIG. 24(a)). The control circuit part 4 judges that a line disconnection occurs in the second wiring 24b when the leak current $I_L$ detected by the second current detection part 3b is less than the lower limit value Ia.

In addition, when the heater part 22 is in an open circuit failure or tends to enter an open circuit failure, an adequate current does not flow in the heater part 22. In this case, as shown in FIG. 25(a), a temperature of the heater part 22 does not adequately increase, and an electrical resistance of the insulation member 23 is not reduced. Accordingly, the leak current $I_L$ detected by each of the pair of the first current detection part 3a and the second current detection part 3b is reduced, and becomes smaller than the lower limit value Ia. The control circuit part 4 determines that a heater failure has occurred in the heater part 22.

Figure 26:
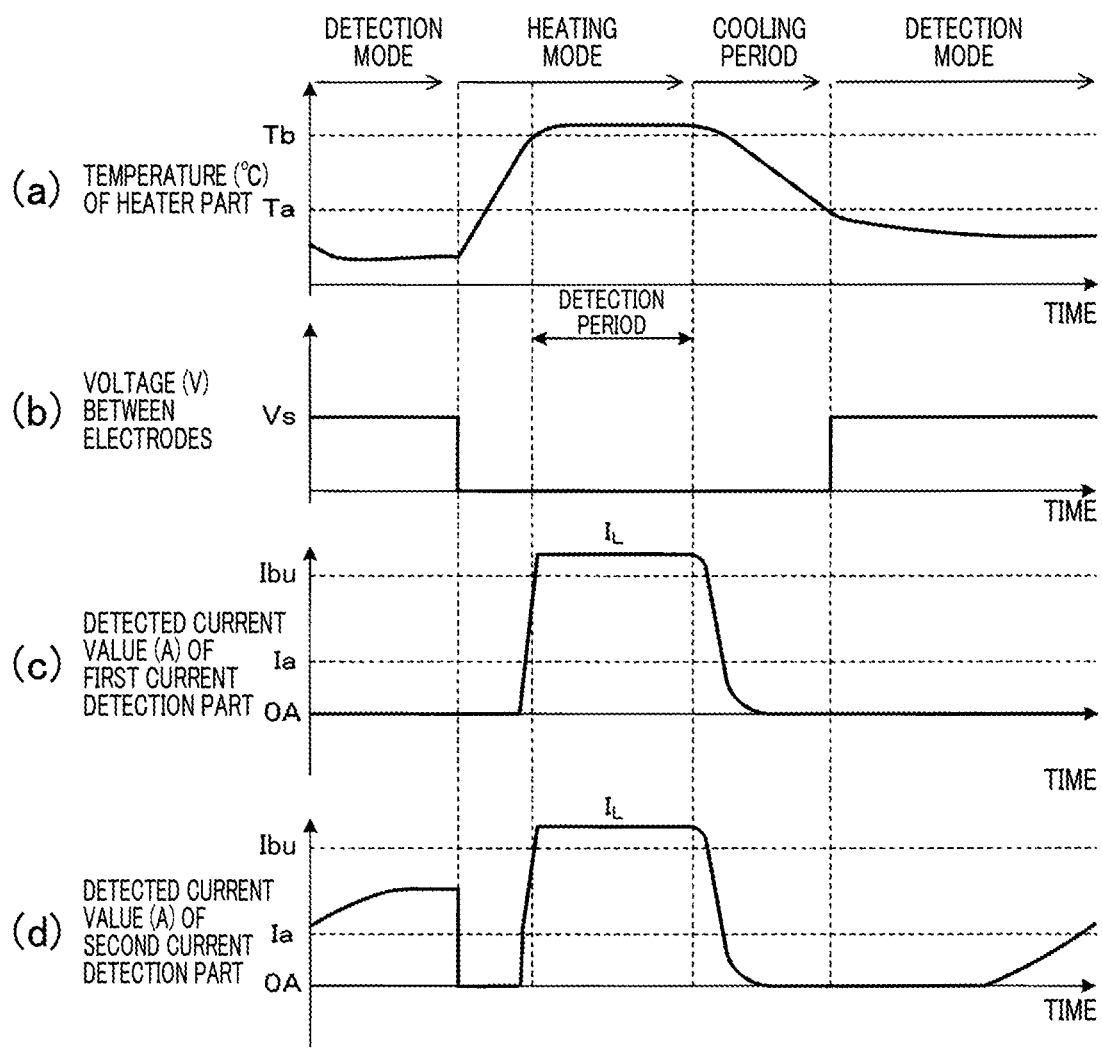
FIG. 26 is a diagram showing various graphs when the insulation member has deteriorated or the heater part has a short circuit in the particulate matter detection system according to the sixth exemplary embodiment, (a) is a graph showing a temperature of the heater part, (b) is a graph showing a voltage between the pair of electrodes, (c) is a graph showing a detected current value of the first current detection part and (d) is a graph showing a detected current value of the second current detection part.

When deterioration occurs in the insulation member 23, as shown in FIG. 26, the leak current $I_L$ increases. When the heater part 22 is short-circuited, and an electrical resistance of the heater part 22 is reduced, the leak current $I_L$ increases. That is, because a current flowing in the heater part 22 increases in the above cases, an amount of heat energy generated by the heater part 22 increases. An excess temperature rising occurs in the heater part 22, and the leak current $I_L$ increases. In the sixth exemplary embodiment, the control circuit part 4 determines that at least one of the deterioration of the insulation member 23 and the heater failure has occurred.

A description will be given of action and effects of the particulate matter detection system 1-1 according to the sixth exemplary embodiment. As shown in FIG. 17 and FIG. 18, the particulate matter detection system 1-1 according to the sixth exemplary embodiment has the pair of the first current detection part 3a and the second current detection part 3b. Further, the control circuit part 4 obtains the leak currents $I_L$ ($I_L$, $I_{L2}$) detected by the pair of the first current detection part 3a and the second current detection part 3b, respectively, where the detected leak currents $I_L$ flow in the first electrode 21a and the second electrode 21b, respectively, from the heater part 22 through the insulation member 23. The control circuit part 4 judges whether a sensor failure occurs in the particulate matter detection sensor 2 on the basis of the detected leak current $I_L$. Accordingly, it is possible for the control circuit part 4 to use both the leak currents $I_L$ ($I_L$, $I_{L2}$) so as to detect a sensor failure in the particulate matter detection sensor 2. That is, it is possible for the particulate matter detection system 1-1 according to the sixth exemplary embodiment to detect a sensor failure of the particulate matter detection sensor 2 with high accuracy.

As shown in FIG. 17 and FIG. 19, the particulate matter detection sensor 2 according to the sixth exemplary embodiment has the two wirings 24a and 24b. The first current detection part 3a and the second current detection part 3b are connected to the wiring 24a and the wiring 24b, respectively. When the detected leak current $I_L$ is less than the predetermined lower limit value Ia, the control circuit part 4 determines that a line disconnection occurs in the wiring 24. In the sixth exemplary embodiment, because the pair of the first current detection part 3a and the second current detection part 3b detect the detected leak currents $I_L$ ($I_{L1}$, $I_{L2}$), respectively, it is possible for the control circuit part 4 to correctly detect the occurrence of a line disconnection even when a line disconnection occurs in at least one of the first wirings 24a and the second wiring 24b.

The particulate matter detection system 1-1 according to the sixth exemplary embodiment has the temperature detection part 5 (see FIG. 17). As shown in FIG. 21, the control circuit part 4 detects the detected leak current $I_L$ when the temperature of the heater part 22 detected by the temperature detection part 5 becomes higher than the predetermined temperature Tb. Accordingly, this makes it possible to detect the detected leak current $I_L$ after the temperature of the heater part 22 adequately increases. This makes it possible to correctly perform the failure detection of the particulate matter detection sensor 2 with high accuracy.

Further, the temperature detection part 5 is configured to detect the temperature of the heater part 22 on the basis of the detected electrical resistance of the heater part 22. Accordingly, this makes it possible to avoid the particulate matter detection system 1-1 from having a dedicated temperature sensor. This makes it possible to reduce a manufacturing cost of producing the particulate matter detection system 1-1 according to the sixth exemplary embodiment.

In the sixth exemplary embodiment, the control circuit part 4 is configured to determine that a heater failure occurs in the heater part 22 when both the detected leak currents $I_L$ ($I_{L1}$, $I_{L2}$) detected by the pair of the first current detection part 3a and the second current detection part 3b are less than the predetermined lower value Ia. This structure makes it possible to detect an occurrence of a heater failure in the heater part 22 in the particulate matter detection sensor 2, and to suppress insufficient burning of particulate matter from occurring. In particular, as previously described, a temperature of the heater part 22 is calculated on the basis of the detected electrical resistance of the heater part 22. There is a case in which an electric resistance of the heater part 22 increases when the heater part 22 does not generate an adequate amount of heat energy. When the electric power is supplied to the heater part 22 and an electrical resistance of the heater part 22 increase, it is difficult for the control circuit part 4 to correctly detect whether the electrical resistance of the heater part 22 increases due to an adequate amount of heat energy generated in the heater part 22 or due to a line disconnection occurred in the heater part 22.

On the other hand, in the structure of the particulate matter detection system 1-1 according to the sixth exemplary embodiment, because the leak current $I_L$ is reduced when the heater part 22 generates a less amount of heat energy due to a line disconnection occurred in the heater part 22, it is possible for the control circuit part 4 to correctly detect the occurrence of line disconnection in the heater part 22 on the basis of the detected leak current $I_L$. This makes it possible to replace the particulate matter detection sensor 2 with a new particulate matter detection sensor at an early stage, and to avoid insufficient burning of particulate matter in the heating mode.

In the sixth exemplary embodiment, the control circuit part 4 is configured to determine that at least one of deterioration of the insulation member 23 and the failure of the heater part 22 occurs when the detected leak current $I_L$ is more than the predetermined upper limit value Ibu. Accordingly, it is possible for the control circuit part 4 to correctly detect the occurrence of deterioration of the insulation member 23 in the particulate matter detection sensor 2 and a short-circuited failure of the heater part 22.

As shown in FIG. 17, the structure of the particulate matter detection system 1-1 according to the sixth exemplary embodiment has the high voltage circuit 11 and the b switch 6. The high voltage circuit 11 generates a high voltage to be supplied to the first electrode 21a as a high voltage side in the pair of the first electrode 21a and the second electrode 21b. The switch 6 is arranged between the first electrode 21a and the second electrode 21b. When detecting an amount of particulate matter, the control circuit part 4 instructs the switch 6 to connect the high voltage circuit 11 to the first electrode 21a. Further, when the heater part 22 generates heat energy, the control circuit part 4 instructs the switch 6 to disconnect the high voltage circuit 11 from the first electrode 21a. This control makes it possible to supply the voltage Vs of the high voltage circuit 11 to the first electrode 21a when the control circuit part 4 detects an amount of particulate matter (see FIG. 18) contained in exhaust gas.

Further, because the high voltage circuit 11 is separated from the first electrode 21a, a high voltage is not supplied to the first electrode 21a when the heater part 22 generates heat energy. In this case, the leak current $I_L$ can flow from the heater part 22 to the first electrode 21a, and the first current detection part 3a correctly detects this leak current $I_L$.

As previously explained, the first exemplary embodiment provides the particulate matter detection system 1-1 capable of reliably and correctly detect an occurrence of a sensor failure of the particulate matter detection sensor 2.

Figure 25:
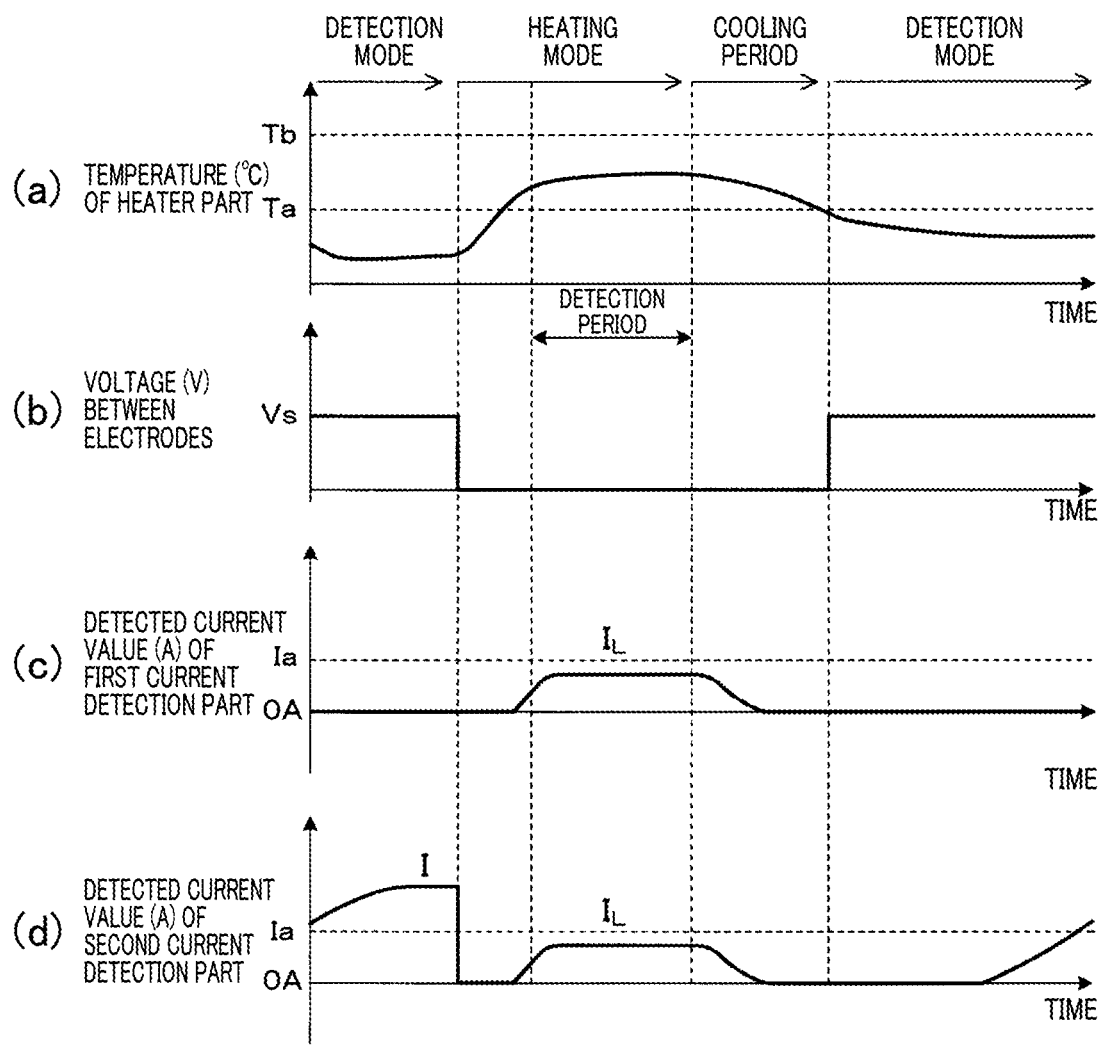
FIG. 25 is a diagram showing various graphs regarding processes of the particulate matter detection system according to the sixth exemplary embodiment, (a) is a graph showing a temperature of the heater part, (b) is a graph showing a voltage between the pair of electrodes, (c) is a graph showing a detected current value of the first current detection part and (d) is a graph showing a detected current value of the second current detection part.

As previously described, in the sixth exemplary embodiment, the control circuit part 4 determines that a heater failure occurs in the heater part 22 when both the detected leak currents $I_L$ ($I_{LL}$, $I_{L2}$) detected by the pair of the first current detection part 3a and the second current detection part 3b are smaller than the lower limit value Ia (see FIG. 25). It is also acceptable for the control circuit part 4 to determine that a line disconnection occurs in both the wirings 24.

In the sixth exemplary embodiment, the temperature of the heater part 22 is calculated on the basis of the detected electrical resistance of the heater part 22. However, the concept of the present invention is not limited by this. It is acceptable to provide a dedicate temperature sensor capable of directly detecting a temperature of the heater part 22.

Seventh Exemplary Embodiment

Figure 29:
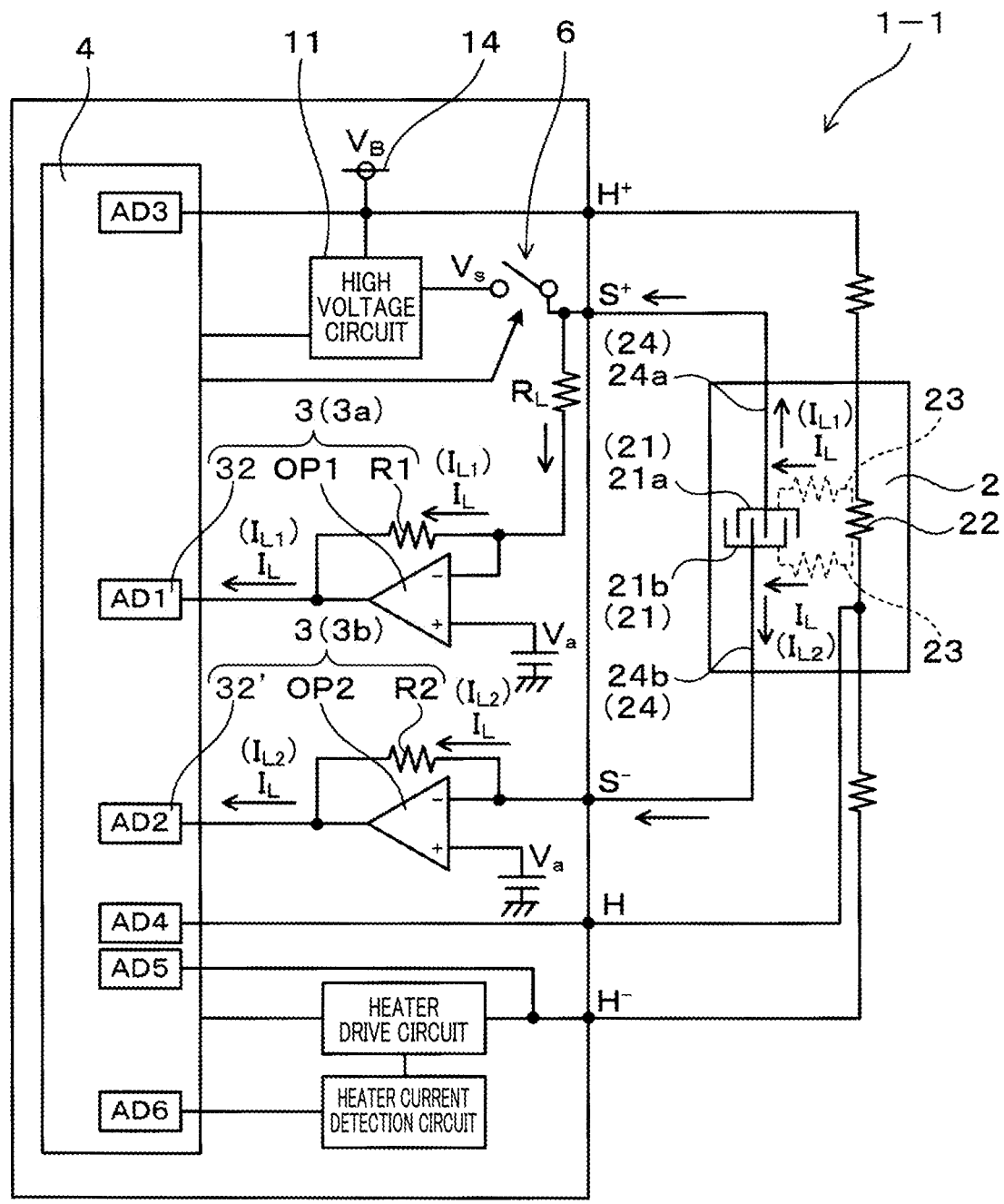
FIG. 29 is a circuit diagram of the particulate matter detection system according to the seventh exemplary embodiment of the present invention.

A description will now be given of the particulate matter detection system according to a seventh exemplary embodiment with reference to FIG. 29. The same reference numbers and characters between the seventh exemplary embodiment and the sixth exemplary embodiment indicate the same components.

The seventh exemplary embodiment provides a modification of the connection between the electrode 21 and the current detection part 3. As shown in FIG. 29, in the structure of the particulate matter detection system according to the seventh exemplary embodiment, the first current detection part 3a is always connected to the first electrode 21a. When switched to the heating mode, the control circuit part 4 turns off the switch 6, and instructs the heater part 22 to generate heat energy, and instructs the pair of the first current detection part 3a and the second current detection part 3b to detect the leak current $I_L$. Further, when switched to the detection mode, the control circuit part 4 turns on the switch 6 so as to connect the first electrode 21a to the high voltage circuit 11. This control makes it possible to supply the voltage Vs of the high voltage circuit 11 so as to collect particulate matter on the accumulation part 20.

Because a current flows from the high voltage circuit 11 to the first current detection part 3a in the detection mode, the particulate matter detection system according to the seventh exemplary embodiment has a limitation resistance RL so as to suppress this current which flows from the high voltage circuit 11 to the first current detection part 3a. Further, the first resistance R1 is higher than that used in the sixth exemplary embodiment. In addition to the features previously described, the particulate matter detection system according to the seventh exemplary embodiment has the same structure, action and effects as the particulate matter detection system according to the sixth exemplary embodiment.

Eighth Exemplary Embodiment

A description will now be given of the particulate matter detection system according to an eighth exemplary embodiment with reference to FIG. 30. The same reference numbers and characters between the eighth exemplary embodiment and the sixth exemplary embodiment indicate the same components.

The eighth exemplary embodiment provides a modification of the material forming the insulation member 23. There is a possible case in which the leak currents detected by the first current detection part 3a and the second current detection part 3b are changed according to the graphs shown in FIGS. 30(c) and (d) when the insulation member 30 has deteriorated. That is, in the heating mode, the leak current $I_L$ does not exceed the upper limit value Ibu. Even if the heater part 22 is cooled, the leak current $I_L$ is not adequately reduced and does not become less than the predetermined threshold value Ic when the heating mode is switched to a cooling mode (see FIG. 30(c), (d)). When the heater part 22 is short-circuited, the leak current $I_L$ varies similarly.

In the eighth exemplary embodiment, the control circuit part 4 is configured to determine that at least one of deterioration of the insulation member 23 and the heater failure of the heater part 22 occurs when the leak currents $I_L$ detected by the first current detection part 3a and the second current detection part 3b are more than the predetermined threshold value Ic after the temperature of the heater part 22 becomes not more than the predetermined value Tc in the cooling mode in which the heater part 22 does not generate heat energy and is cooled.

In addition to the features previously described, the particulate matter detection system according to the eighth exemplary embodiment has the same structure, action and effects as the particulate matter detection system according to the sixth exemplary embodiment.

REFERENCE SIGNS LIST

1 Particulate matter detection system, 2 Particulate matter detection sensor, 3 Current detection part, 4 Control circuit part, 20 Accumulation part, 21 Electrodes, 22 Heater part, 23 insulation member, and $I_L$ Leak current.

The invention claimed is:

1. A particulate matter detection system comprising:
a particulate matter detection sensor;
a current detection part; and
a control circuit part,
wherein the particulate matter detection sensor comprises:
   an accumulation part on which particulate matter contained in exhaust gas is accumulated;
   a pair of electrodes arranged to be separated from each other on the accumulation part; and
   a heater part heating the accumulation part,
wherein the current detection part is electrically connected to one of the pair of electrodes,
the control circuit part is electrically connected to the particulate matter detection sensor and the current detection part,
the control circuit part performs a switching control of a detection mode and a burning mode,
in the detection mode, the control circuit part prohibits supply of power to the heater part, supplies a voltage to the pair of electrodes, and instructs the current detection part to detect a current flowing between the pair of electrodes, and
in the burning mode, the control circuit part supplies to the heater part a voltage, which is smaller than a voltage supplied between the pair of electrodes in the detection mode, so that the heater part generates heat energy so as to burn particulate matter accumulated between the pair of electrodes, and
the control circuit part judges that particulate matter remains on the accumulation part, and performs the burning mode again when the current value detected by the current detection part is more than a predetermined current value at a time immediately after the burning mode is switched to the detection mode,
wherein the control circuit part determines that a failure occurs in the particulate matter detection sensor when judging that the particulate matter has remained on the accumulation part, and when detecting the number of times that the burning mode has continuously performed is more than a predetermined number, and
wherein when the particulate matter has remained on the accumulation part, the control circuit part performs the burning mode again so as to burn the particulate matter remained on the accumulation part and eliminate it from the accumulation part, and then detects an amount of particulate matter contained in exhaust gas.

2. The particulate matter detection system according to claim 1, further comprising a temperature detection part which detects a temperature of the heater part, wherein
the control circuit part is configured to switch to the detection mode when a temperature of the heater part detected by the temperature detection part is smaller than a predetermined temperature value after the burning mode is finished.

3. A particulate matter detection system comprising:
a particulate matter detection sensor;
a pair of current detection parts; and
a control circuit part, wherein the particulate matter detection sensor comprises:
   an accumulation part on which particulate matter contained in exhaust gas is accumulated;
   a pair of electrodes arranged to be separated from each other on the accumulation part;
   a heater part heating the accumulation part; and
   an insulation member arranged between the pair of electrodes and the heater part,
wherein the pair of current detection part are electrically connected to the pair of electrodes, respectively,
the control circuit part is electrically connected to the particulate matter detection sensor and the pair of current detection parts,
the control circuit part instructs the pair of current detection parts to detect a leak current which is flowing from the heater part to the pair of electrodes through the insulation member during a heating mode in which an electric power is supplied to the heater part and the heater part heats the accumulation part and the insulation member, and the control circuit part judges in the heating mode whether a failure state occurs in the particulate matter detection sensor on the basis of a magnitude of the detected leak current,
control circuit part switches to the detection mode after the temperature of the heater part has been reduced, and no leak current is detected,
the particular matter detection sensor comprises a pair of wirings, and the pair of current detection parts are electrically connected to the pair of electrodes through the pair of wirings, respectively, and
the control circuit part is configured to judge that a line disconnection occurs in the pair of wirings when the leak current is less than a predetermined lower limit value in the heating mode.

4. The particulate matter detection system according to claim 3, wherein the control circuit part is configured to judge that a failure occurs in the heater part when both the leak currents detected by the pair of current detection parts, respectively, are less than a predetermined lower limit value in the heating mode.

5. The particulate matter detection system according to claim 3, wherein the control circuit part is configured to judge that at least one of deterioration of the insulation member and a heater failure of the heater part occurs when the leak current is more than a predetermined threshold value in the heating mode.

6. The particulate matter detection system according to claim 3, further comprising a temperature detection part, wherein the control circuit part is configured to detect the leak currant after the temperature of the heater part detected by the temperature detection part becomes more than a predetermined temperature value in the heating mode.

7. The particulate matter detection system according to claim 6, wherein the temperature detection part detects an electrical resistance of the heater part so as to obtain a temperature of the heater part.

8. The particulate matter detection system according to claim 3, further comprising a high voltage circuit generating a voltage to be supplied to a first electrode at a high voltage side electrode in the pair of electrodes, and a switch arranged between the first electrode and the high voltage circuit, wherein the control circuit part instructs the switch to connect the first electrode to the high voltage circuit when detecting an amount of particulate matter contained in exhaust gas, and instructs the switch to prohibit the first electrode from being connected to the high voltage circuit when heating the heater part.

9. A particulate matter detection system comprising:
a particulate matter detection sensor;
a pair of current detection parts; and
a control circuit part, wherein
the particulate matter detection sensor comprises:
  an accumulation part on which particulate matter contained in exhaust gas is accumulated;
  a pair of electrodes arranged to be separated from each other on the accumulation part;
  a heater part heating the accumulation part; and
  an insulation member arranged between the pair of electrodes and the heater part,
wherein the pair of current detection part are electrically connected to the pair of electrodes, respectively,
the control circuit part is electrically connected to the particulate matter detection sensor and the pair of current detection parts,
the control circuit part instructs the pair of current detection parts to detect a leak current which is flowing from the heater part to the pair of electrodes through the insulation member when the heater part generates heat energy, and
the control circuit part judges whether a failure state occurs in the particulate matter detection sensor on the basis of the detected leak current,
wherein the particulate matter detection sensor comprises a pair of wirings, and the pair of current detection parts are electrically connected to the pair of electrodes through the pair of wirings, respectively, and
the control circuit part is configured to judge that a line disconnection occurs in the pair of wirings when the leak current is less than a predetermined lower limit value.

10. A particulate matter detection system comprising:
a particulate matter detection sensor;
a pair of current detection parts; and
a control circuit part, wherein the particulate matter detection sensor comprises:
  an accumulation part on which particulate matter contained in exhaust gas is accumulated;
  a pair of electrodes arranged to be separated from each other on the accumulation part;
  a heater part heating the accumulation part; and
  an insulation member arranged between the pair of electrodes and the heater part,
wherein the pair of current detection part are electrically connected to the pair of electrodes, respectively,
the control circuit part is electrically connected to the particulate matter detection sensor and the pair of current detection parts,
the control circuit part instructs the pair of current detection parts to detect a leak current which is flowing from the heater part to the pair of electrodes through the insulation member when the heater part generates heat energy, and
the control circuit part judges whether a failure state occurs in the particulate matter detection sensor on the basis of the detected leak current, and
wherein the control circuit part is configured to judge that a failure occurs in the heater part when both the leak currents detected by the pair of current detection parts, respectively, are less than a predetermined lower limit value.

11. A particulate matter detection system comprising:
a particulate matter detection sensor;
a pair of current detection parts; and
a control circuit part,
wherein the particulate matter detection sensor comprises:
  an accumulation part on which particulate matter contained in exhaust gas is accumulated;
  a pair of electrodes arranged to be separated from each other on the accumulation part;
  a heater part heating the accumulation part; and
  an insulation member arranged between the pair of electrodes and the heater part,
wherein the pair of current detection part are electrically connected to the pair of electrodes, respectively,
the control circuit part is electrically connected to the particulate matter detection sensor and the pair of current detection parts,
the control circuit part instructs the pair of current detection parts to detect a leak current which is flowing from the heater part to the pair of electrodes through the insulation member during a heating mode in which an electric power is supplied to the heater part and the heater part heats the accumulation part and the insulation member, and the control circuit part judges in the heating mode whether a failure state occurs in the particulate matter detection sensor on the basis of a magnitude of the detected leak current,
the control circuit part switches to the detection mode after the temperature of the heater part has been reduced, and no leak current is detected, and
the control circuit part is configured to judge that a failure occurs in the heater part when both the leak currents detected by the pair of current detection parts, respectively, are less than a predetermined lower limit value in the heating mode.

* * * * *